United States Patent
Beaudin et al.

(10) Patent No.: US 11,362,692 B2
(45) Date of Patent: Jun. 14, 2022

(54) APPARATUS AND METHOD FOR CONTROLLING A SWITCHABLE FILTER FOR COEXISTENCE BETWEEN WIRELESS PROTOCOLS

(71) Applicant: QUALCOMM Incorporated, San Diego, CA (US)

(72) Inventors: Steve Andre Beaudin, Fremont, CA (US); Patric Heide, Munich (DE); Wai San Wong, San Diego, CA (US); Michael Kohlmann, San Francisco, CA (US); David Maldonado, San Diego, CA (US); Ryan Scott Castro Spring, San Diego, CA (US); Stefan Freisleben, Neubiberg (DE); Mykola Shevelov, Munich (DE); Francis Ming-Meng Ngai, Louisville, CO (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/005,762

(22) Filed: Aug. 28, 2020

(65) Prior Publication Data
US 2021/0067186 A1    Mar. 4, 2021

Related U.S. Application Data

(60) Provisional application No. 62/894,338, filed on Aug. 30, 2019.

(51) Int. Cl.
*H04B 1/10* (2006.01)
*H04B 1/401* (2015.01)
*H04B 1/00* (2006.01)

(52) U.S. Cl.
CPC .......... *H04B 1/1036* (2013.01); *H04B 1/005* (2013.01); *H04B 1/401* (2013.01); *H04B 2001/1063* (2013.01)

(58) Field of Classification Search
CPC ...... H04B 1/1036; H04B 1/005; H04B 1/401; H04B 2001/1063
See application file for complete search history.

(56) References Cited

U.S. PATENT DOCUMENTS

| | | | |
|---|---|---|---|
| 2011/0116490 A1* | 5/2011 | Wilhelmsson | H04W 16/14 370/343 |
| 2012/0009886 A1* | 1/2012 | Poulin | H04B 7/0825 455/78 |

(Continued)

*Primary Examiner* — Nguyen T Vo
(74) *Attorney, Agent, or Firm* — Qualcomm Incorporated

(57) ABSTRACT

Certain aspects of the disclosure related to communications apparatus provides isolation between wireless protocols when operating currently while incurring the additional insertion loss based on providing the isolation only when needed. In an aspect, an apparatus include a switched filter coupled to an antenna where the switched filter includes a filter and a bypass line along with switching circuitry configured to selectively establish a bypass signal path including the bypass line or a filtered signal path including the filter. The apparatus further includes a switched filter controller configured to cause the switching circuitry to selectively connect a transceiver unit to the antenna via the bypass signal path or via the filtered signal path based at least on a frequency band of a carrier signal and a bandwidth of the carrier signal.

28 Claims, 19 Drawing Sheets

(56) References Cited

U.S. PATENT DOCUMENTS

2013/0225107 A1* 8/2013 Lane .................. H04B 1/04
455/234.1
2014/0050146 A1* 2/2014 Chrisikos ............ H04W 16/14
370/328

* cited by examiner

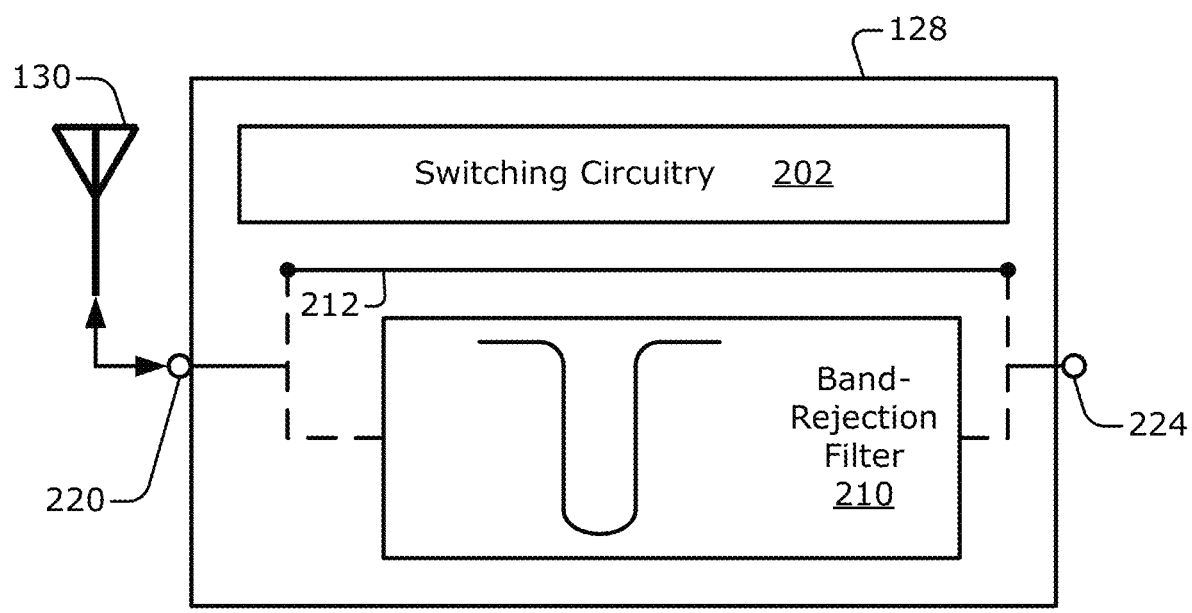
FIG. 2B

| Carrier Signal Bandwidth | Fc<2510 MHz | 2500<=Fc<2525 MHz | 2525<=Fc<2550 | 2550<=Fc<2575 | 2575<=Fc<2600 | 2600<=Fc |
|---|---|---|---|---|---|---|
| 5 | Filter | bypass | bypass | bypass | bypass | bypass |
| 10 | Filter | bypass | bypass | bypass | bypass | bypass |
| 15 | Filter | bypass | bypass | bypass | bypass | bypass |
| 20 | Filter | Filter | bypass | bypass | bypass | bypass |
| 40 | na | Filter | Filter | bypass | bypass | bypass |
| 50 | na | Filter | Filter | Filter | bypass | bypass |
| 60 | na | na | Filter | Filter | bypass | bypass |
| 80 | na | na | Filter | Filter | Filter | bypass |
| 100 | na | na | Filter | Filter | Filter | bypass |

Center Frequency

APPARATUS AND METHOD FOR CONTROLLING A SWITCHABLE FILTER FOR COEXISTENCE BETWEEN WIRELESS PROTOCOLS

CLAIM OF PRIORITY UNDER 35 U.S.C. § 119

The present application for patent claims priority to Provisional Application No. 62/894,338 entitled "APPARATUS AND METHOD FOR CONTROLLING A SWITCHABLE FILTER FOR COEXISTENCE BETWEEN WIRELESS PROTOCOLS" filed Aug. 30, 2019 and assigned to the assignee hereof and hereby expressly incorporated by reference herein in its entirety.

TECHNICAL FIELD

This disclosure relates generally to electronic communications and, more specifically, to managing coexistence between wireless protocols while balancing efficiency and performance.

BACKGROUND

Many of the services provided by electronic devices in today's interconnected world depend at least partly on electronic communications. Electronic communications can include those exchanged between or among distributed electronic devices using wireless or wired signals that are transmitted over one or more networks, such as the Internet or a cellular network. Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard.

Electronic devices are expected to be able to handle different types of wireless communications. However, different electronic devices are expected to meet different size, cost, power usage, or other constraints. Consequently, electrical engineers and other designers of electronic devices strive to enable electronic devices to handle wireless communications of different types while taking into account efficiency and performance constraints.

SUMMARY

Performing or enabling enhanced coexistence management between wireless protocols is disclosed herein.

In an aspect, a wireless communications apparatus is provided. The apparatus includes a switched filter coupled to an antenna. The switched filter includes a filter, a bypass line, and switching circuitry coupled to the filter and the bypass line. The switching circuitry is configured to selectively establish a bypass signal path including the bypass line or a filtered signal path including the filter. The apparatus further includes a transceiver unit coupled to the antenna via the switched filter. The transceiver unit is configured to process a carrier signal transmitted or received via the antenna. The apparatus further includes a switched filter controller coupled to the switching circuitry. The switched filter controller is configured to cause the switching circuitry to selectively connect the transceiver unit to the antenna via the bypass signal path or via the filtered signal path based at least on a frequency band of the carrier signal and a bandwidth of the carrier signal.

In another aspect, a wireless communications apparatus is provided. The apparatus includes a switched filter coupled to an antenna. The switched filter includes a notch filter having a rejection band in a Wi-Fi frequency band. The switched filter further includes a bypass line and switching circuitry coupled to the filter and the bypass line. The switching circuitry is configured to selectively establish a bypass signal path including the bypass line or a filtered signal path including the filter. The apparatus further includes a transceiver unit coupled to the antenna via the switched filter. The transceiver unit is configured to process a carrier signal for a n41 or n79 frequency band transmitted or received via the antenna. The apparatus further includes a switched filter controller coupled to the switching circuitry. The switched filter controller is configured to cause the switching circuitry to selectively connect the transceiver unit to the antenna via the bypass signal path or via the filtered signal path based at least on a bandwidth of the carrier signal.

In yet another aspect, a method for wireless communications is provided. The method includes receiving information associated with a carrier signal including a frequency band of the carrier signal and a bandwidth of the carrier signal. The method further includes selectively causing switching circuitry to connect a transceiver unit to an antenna via one of a filtered signal path that includes a filter or a bypass signal path that bypasses the filter based on the information.

In yet another aspect, a wireless communications apparatus is provided. The apparatus includes a switched filter coupled to an antenna. The switched filter includes a filter, means for bypassing the filter, and switching means for establishing a bypass signal path including the bypassing means or a filtered signal path including the filter. The apparatus further includes a transceiver unit coupled to the antenna via the switched filter. The transceiver unit is configured to process a carrier signal transmitted or received via the antenna. The apparatus further includes means for causing the switching means to selectively connect the transceiver unit to the antenna via the bypass signal path or via the filtered signal path based at least on a frequency band of the carrier signal and a bandwidth of the carrier signal.

In yet another aspect, a wireless communications apparatus is provided. The apparatus includes a transceiver unit configured to process a carrier signal transmitted or received via an antenna. The apparatus further includes a first filter coupled between the antenna and the transceiver unit. Is The first filter configured to attenuate frequencies in a first frequency rejection band. The apparatus further includes a switched filter coupled between the filter and the transceiver unit. The switched filter includes a second filter configured to attenuate frequencies in a second frequency rejection band at least partially overlapping the first frequency rejection band. The switched filter further includes a bypass line. The switched filter further includes switching circuitry coupled to the second filter and the bypass line. The switching circuitry is configured to selectively establish a bypass signal path including the bypass line or a filtered signal path including the second filter.

BRIEF DESCRIPTION OF DRAWINGS

FIG. 2B illustrates an example filter along with switching circuitry that can be implemented as part of a switched filter of FIG. 2A.

FIG. 7 is a table that illustrates an example of different combinations of carrier signal bandwidths and center frequencies that correspond to different selections of either the filtered signal path or the bypass signal path.

DETAILED DESCRIPTION

Figure 1:
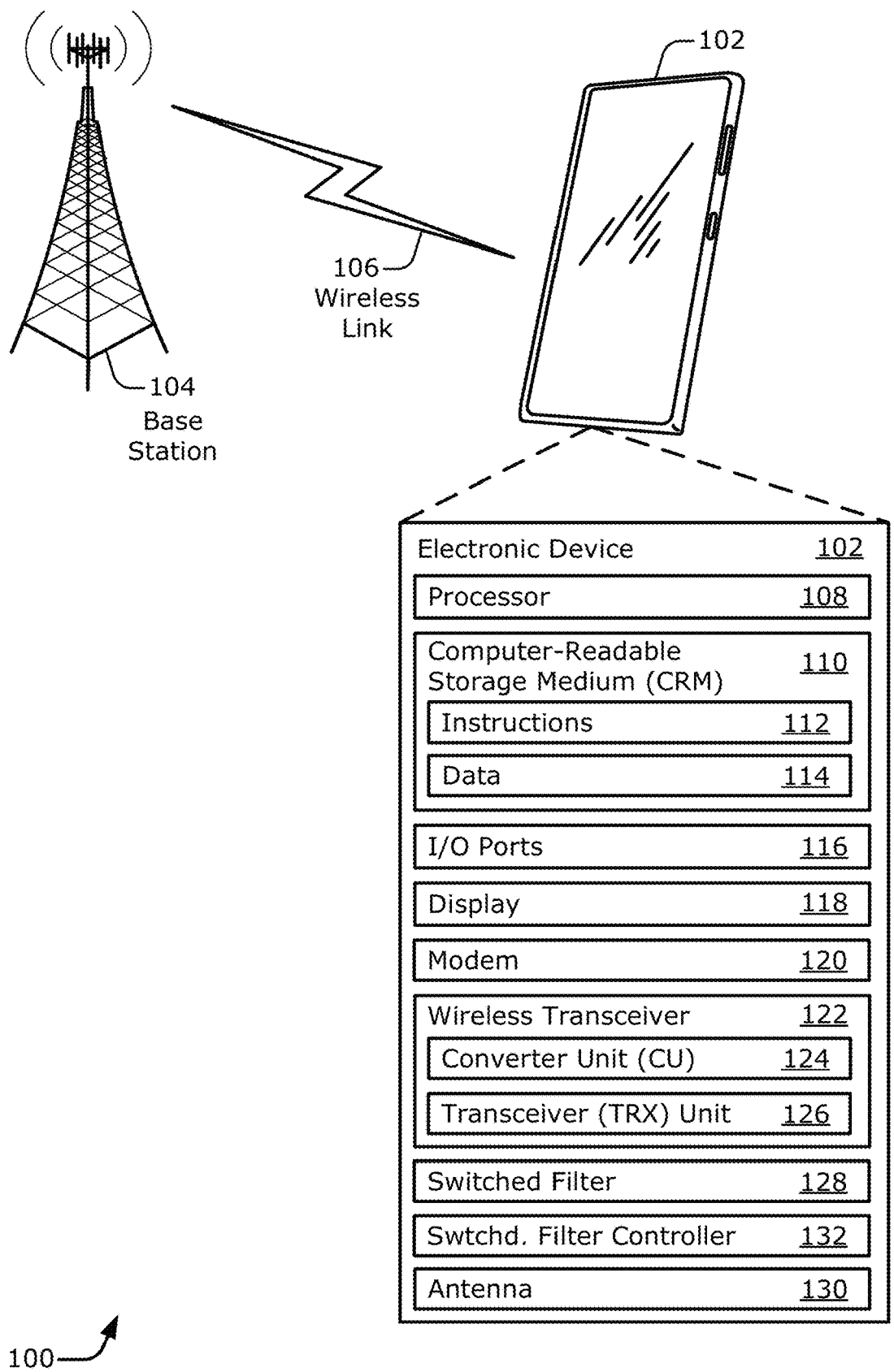
FIG. 1 illustrates an example environment that includes an electronic device in which a switched filter can be implemented for enhanced coexistence management and performance when operating multiple wireless protocols.

Demands for larger data rates and increased throughput have pushed development of wireless protocols, such as the 5G New Radio protocol, to specify additional frequency bands along with wider modulation bandwidths. Additional frequency bands and wider bandwidths increase coexistence challenges between adjacently operating wireless protocols. For example, wider modulation bandwidths may result in distortion that extends into nearby bands desensing collocated receivers in an electronic device. In a particular example, increasing bandwidths of signals operating in a cellular frequency band adjacent to a Wi-Fi frequency band may cause distortion in the Wi-Fi frequency band.

In order to preserve coexistence, more isolation may be needed between frequency bands. In certain aspects, this can be achieved via additional filtering. But additional filtering generally increases insertion loss. Increasing insertion loss decreases transmit power and reduces receive sensitivity. Also, modulation bandwidths and selected frequency bands/channels are dynamic (e.g., changing based on either geographic location and/or based on changing network conditions). Only certain operating scenarios and combinations of bandwidths and operating frequency bands between different wireless protocols may warrant additional isolation. Providing filtering in scenarios where additional rejection is unwarranted may unnecessarily increase insertion loss in such cases.

Aspects of the present disclosure are related to configurations that use a switched filter with a filtered signal path including a filter and a bypass signal path that allows for selectively bypassing the filter. Based on information about the current operating conditions (e.g., carrier signal frequency band, operating bandwidth within the frequency band, and location of a center frequency within the frequency band, etc.), a switched filter controller is configured determine when the filter can be bypassed (e.g., may be bypassed when additional rejection is not needed). Any insertion loss due to the filter is thereby avoided and limited to lower insertion loss of the bypass signal path. Likewise, a switched filter controller can determine when further filtering is advantageous to prevent interference between wireless protocols. In this way, the electronic device can fully support concurrency between different wireless protocols even while supporting new bands and signal bandwidths, while also limiting unnecessary insertion loss.

In example implementations, an electronic device includes a switched filter, and the switched filter includes a filter, a bypass line, and switching circuitry. In certain examples, the filter may be a notch or band-rejection filter. However other filtering configurations may also be used. The bypass line can propagate a signal passing through the bypass line without appreciably attenuating a particular frequency range or ranges of the incoming signal.

In an example operation, the switching circuitry selectively routes a signal across the switched filter in response to a control signal from a switched filter controller. In a filtering mode, the switching circuitry routes the signal through the filter. However, in some scenarios, the effects on the incoming signal by the filter outweigh the benefits of increased isolation with other frequency bands. For example, the insertion loss of the filter may adversely impact the power level or efficiency of the transmitter. In such situations, a switched filter controller causes the switching circuitry to reconfigure the switched filter into a bypass mode. For the bypass mode, the switching circuitry routes the signal via the bypass line that does not include the filter. Example implementations with apparatuses, arrangements, and methods for enhanced coexistence management are described herein.

FIG. 1 illustrates an example environment 100 that includes an electronic device 102 in which a switched filter 128 can be implemented for enhanced coexistence management and performance when operating multiple wireless protocols. In the environment 100, the electronic device 102 communicates with a base station 104 through a wireless communication link 106 (wireless link 106). In this example, the electronic device 102 is depicted as a smart phone. However, the electronic device 102 may be implemented as any suitable computing or other electronic device, such as a cellular base station, broadband router, access point, cellular or mobile phone, gaming device, navigation device, media device, laptop computer, desktop computer, tablet computer, server, network-attached storage (NAS) device, smart appliance, vehicle-based communication system, Internet-of-Things (IoT) device, and so forth.

The base station 104 communicates with the electronic device 102 via the wireless link 106, which may be implemented as any suitable type of wireless link. Although depicted as a base station tower of a cellular radio network, the base station 104 may represent or be implemented as another device, such as a satellite, cable television head-end, terrestrial television broadcast tower, access point, peer-to-peer device, mesh network node, router, fiber optic line, another electronic device generally, and so forth. Hence, the electronic device 102 may communicate with the base station 104 or another device via a wired connection, a wireless connection, or a combination thereof.

The wireless link 106 can include a downlink of data or control information communicated from the base station 104 to the electronic device 102 and an uplink of other data or control information communicated from the electronic device 102 to the base station 104. The wireless link 106 may be implemented using any suitable communication protocol or standard, such as 3rd Generation Partnership Project Long-Term Evolution (3GPP LTE), 5G New Radio (3GPP 5GNR), IEEE 802.11, IEEE 802.16, Bluetooth™, and so forth.

The electronic device 102 includes a processor 108 and a computer-readable storage medium 110 (CRM 110). The processor 108 may include any type of processor, such as an application processor or a multi-core processor, that is configured to execute processor-executable instructions (e.g., code) stored by the CRM 110. The CRM 110 may include any suitable type of data storage media, such as volatile memory (e.g., random access memory (RAM)), non-volatile memory (e.g., Flash memory), optical media, magnetic media (e.g., disk or tape), and so forth. In the context of this disclosure, the CRM 110 is implemented to store instructions 112, data 114, and other information of the electronic device 102, and thus does not include transitory propagating signals or carrier waves.

The electronic device 102 may also include input/output ports 116 (I/O ports 116) or a display 118. The I/O ports 116 enable data exchanges or interaction with other devices, networks, or users. The I/O ports 116 may include serial ports (e.g., universal serial bus (USB) ports), parallel ports, audio ports, infrared (IR) ports, and so forth. The display 118 can be realized as a screen or projection that presents graphics, e.g. —one or more graphical images, of the electronic device 102, such as for a user interface associated with an operating system, program, or application. Alternatively or additionally, the display 118 may be implemented as a display port or virtual interface through which graphical content of the electronic device 102 is communicated or presented.

For communication purposes, the electronic device 102 also includes a modem 120, a wireless transceiver 122, a switched filter 128, a switched filter controller 132, and an antenna 130. The wireless transceiver 122 provides connectivity to respective networks and other electronic devices connected therewith using radio-frequency (RF) wireless signals. Additionally or alternatively, the electronic device 102 may include a wired transceiver, such as an Ethernet or fiber optic interface for communicating over a personal or local network, an intranet, or the Internet. The wireless transceiver 122 may facilitate communication over any suitable type of wireless network, such as a wireless local area network (LAN) (WLAN) such as Wi-Fi or Bluetooth, a peer-to-peer (P2P) network, a mesh network, a cellular network, a wireless wide-area-network (WWAN) such as 3GPP2 LTE or 5G NR, a navigational network (e.g., the Global Positioning System (GPS) of North America or another Satellite Positioning System (SPS)), and/or a wireless personal-area-network (WPAN). In the context of the example environment 100, the wireless transceiver 122 enables the electronic device 102 to communicate with the base station 104 and networks connected therewith. Other figures referenced herein may pertain to other wireless networks.

The modem 120, such as a baseband modem, may be implemented as a system on-chip (SoC) that provides a digital communication interface for data, voice, messaging, and other applications of the electronic device 102. The modem 120 may also include baseband circuitry to perform high-rate sampling processes that can include analog-to-digital conversion (ADC), digital-to-analog conversion (DAC), gain correction, skew correction, frequency translation, and so forth. The modem 120 may also include logic to perform in-phase/quadrature (I/Q) operations, such as synthesis, encoding, modulation, demodulation, and decoding. More generally, the modem 120 may be realized as a digital signal processor (DSP) or a processor that is configured to perform signal processing to support communications via one or more networks. Alternatively, ADC or DAC operations may be performed by a separate component or another illustrated component, such as the wireless transceiver 122.

The wireless transceiver 122 can include circuitry, logic, and other hardware for transmitting or receiving a wireless signal for at least one communication frequency band. In operation, the wireless transceiver 122 can implement at least one radio-frequency transceiver unit to process data and/or signals associated with communicating data of the electronic device 102 via the antenna 130. Generally, the wireless transceiver 122 can include filters, switches, amplifiers, and so forth for routing and processing signals that are transmitted or received via the antenna 130. As shown, the wireless transceiver 122 includes at least one converter unit 124 (e.g., for ADC or DAC operations) and at least one transceiver (TRX) unit 126. But generally, the wireless transceiver 122 includes multiple transceiver units (e.g., for different wireless protocols such as WLAN versus WWAN or for supporting different frequency bands or frequency band combinations).

Figure 2A:
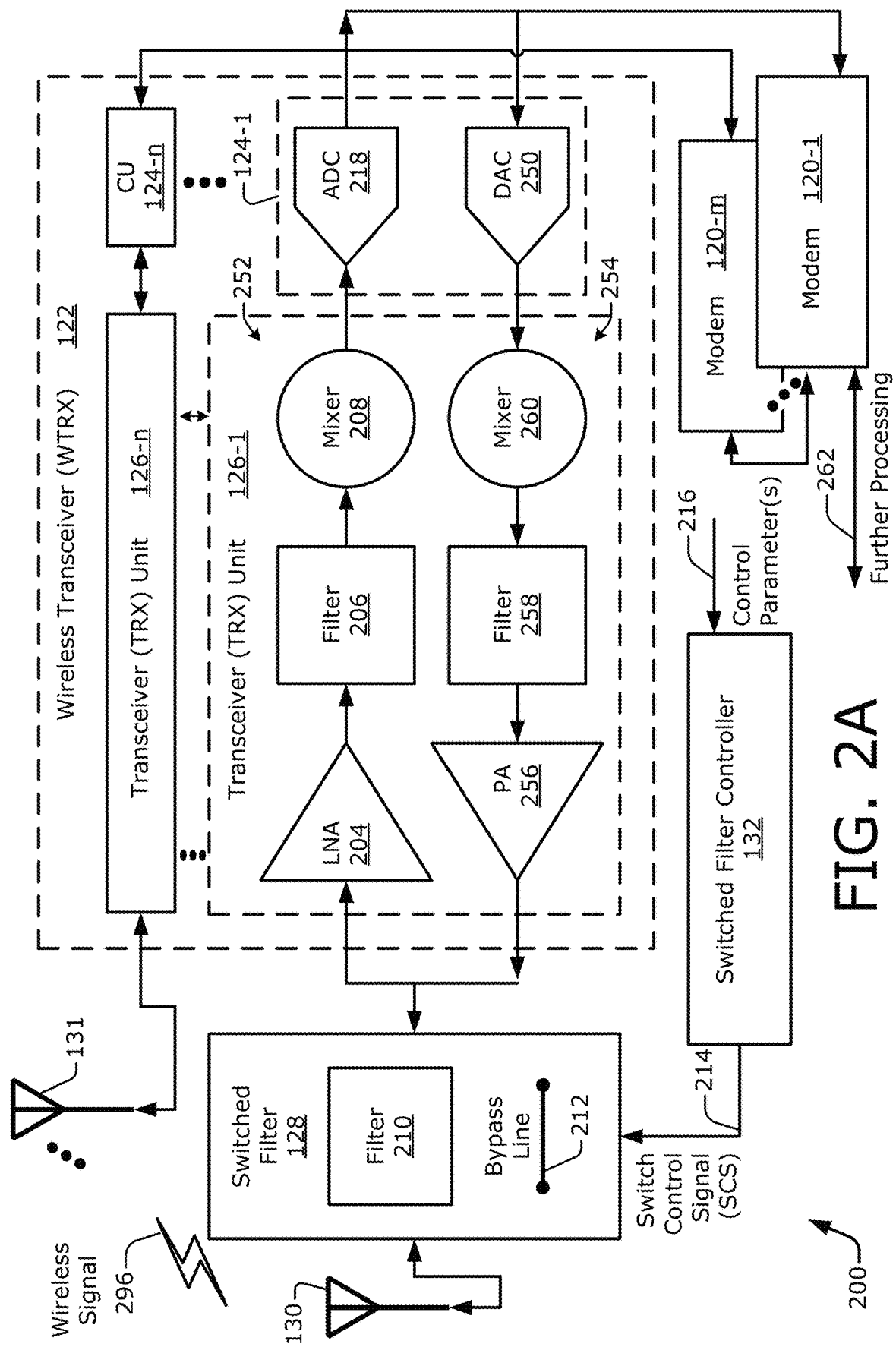
FIG. 2A illustrates an example switched filter coupled between an antenna and a wireless transceiver.

In some cases, components of the wireless transceiver 122, or a transceiver unit 126 thereof, are implemented as separate receiver and transmitter entities. Additionally or alternatively, the wireless transceiver 122 can be realized using multiple or different sections to implement respective receiving and transmitting operations (e.g., using separate transmit and receive chains). Example implementations of a transceiver unit 126 are described below with reference to FIG. 2A. Further, example implementations of a switched filter 128 and a switched filter controller 132, including interactions with the wireless transceiver 122 and the modem 120, are shown in FIG. 2A and described herein. At least a portion of the switched filter controller 132 may be implemented by the modem 120. In addition, different wireless protocols such as WWAN and WLAN may be implemented on separate chips or as separate SoCs. As such, the blocks such as the modem 120 and transceiver 122 may represent more than one modem 120 or transceiver implemented either together on separate chips or separate SoCs.

FIG. 2A illustrates generally at 200 an example switched filter 128 coupled between an antenna 130 and a wireless transceiver 122 that may be examples of the components of the electronic device 102 described with reference to FIG. 1. The example switched filter 128 includes at least one filter 210 and at least one bypass line 212. From left to right, the antenna 130 is coupled to the switched filter 128, and the switched filter 128 is coupled to the wireless transceiver 122. In some implementations, additional filters or other circuitry (not shown) may be connected either between the antenna 130 and the switched filter 128 or between the switched filter 128 and the wireless transceiver 122. The wireless transceiver 122 is coupled to one or more of multiple modems 120-1 . . . 120-$m$, with "m" representing a positive integer. The wireless transceiver 122 includes one or more transceiver units 126-1 . . . 126-$n$, with "n" representing a positive integer. Each of the transceiver units may be associated with either different wireless protocols or associated with different frequency bands. For example, transceiver unit 126-1 may be associated with a WWAN wireless protocol and be configured for transmitting or receiving using a particular set of frequency bands. Transceiver unit 126-$n$ may be associated with a WLAN wireless protocol such as Wi-Fi (e.g., in the 2.4 GHz Wi-Fi band). Alternatively, transceiver unit 126-$n$ may be associated with a different set of frequency bands of a WWAN wireless protocol as compared to transceiver unit 126-1. As shown, different transceiver units 126-1 . . . 126$n$ may be connected to different antennas 130 and 131 respectively. Alternatively, certain transceiver units 126-1 . . . 126-$n$ may share an antenna 130 (e.g., either through a frequency duplexing scheme or a time duplexing scheme and be routed via duplexers/diplexers or using other signal splitting techniques). In addition, there may be further antennas (not shown) for either other transceiver units, for use as diversity antennas, or for multiple-input, multiple-output (MIMO) applications.

As part of the wireless transceiver 122, each transceiver unit 126-1 to 126-$n$ is respectively coupled to an associated converter unit (CU) 124-1 to 124-$n$. Each converter unit 124, as depicted at the converter unit 124-1, can include an analog-to-digital converter (ADC) 218 or a digital-to-analog converter (DAC) 250. As shown, the transceiver unit 126-1 is coupled to the modem 120-1 (e.g., via the converter unit 124-1), and the transceiver unit 126-$n$ is coupled to the modem 120-$m$. However, multiple transceiver units 126 can be coupled to a same modem 120. Although only certain components are explicitly depicted in FIG. 2A, the wireless transceiver 122 may include other non-illustrated components. Further, the converter units 124-1 to 124-$n$ may be separate from the wireless transceiver 122, such as by being part of a modem 120. The modems 120-1 . . . 120$m$ may communicate with each other via communication pins (e.g., implementing a general purpose input-output (GPIO) scheme). Data received and processed via the modems 120-1 . . . 120$m$ may be passed to other portions (e.g., applications processor, DSP, audio processor, and the like) of an electronic device 102 for further processing as indicated by arrow 262.

The transceiver unit 126-1 includes a receiver 252 (or receive chain) and a transmitter 254 (or transmit chain). In some implementations, a transceiver unit 126-1 may include a transmitter 254 (or transmit chain) without a receiver 252 (or receive chain), or vice versa. The receiver 252 includes a low-noise amplifier 204 (LNA 204), a filter 206, and a mixer 208 for frequency down-conversion. The transmitter 254 includes a power amplifier 256 (PA 256), a filter 258, and a mixer 260 for up-conversion. However, the transceiver unit 126-1 can include other components, such as additional amplifiers or multiple mixers, that are disposed anywhere along the depicted receive and transmit chains. These example components can at least partially implement a radio-frequency front-end (RFFE) for the associated electronic device 102. The receiver 252 is coupled between the switched filter 128 and the ADC 218, e.g., via the low-noise amplifier 204 and the mixer 208, respectively. The transmitter 254 is coupled between the switched filter 128 and the DAC 250, e.g., via the power amplifier 256 and the mixer 260, respectively.

Thus, as shown for the receiver 252 of the transceiver unit 126-1, the switched filter 128 is coupled to the low-noise amplifier 204, and the low-noise amplifier 204 is coupled to the filter 206. The filter 206 is coupled to the mixer 208, and the mixer 208 is coupled to the ADC 218. The ADC 218 is coupled to, or is part of, the modem 120-1. An example signal-receiving operation that includes the receiver 252 of the transceiver unit 126-1 and the switched filter 128 is described below. In some implementations, different transceiver units are associated with different wireless communication technologies, such as WWAN or WLAN. Additionally or alternatively, different transceiver units may provide parallel processing capabilities for a same wireless communication technology.

As part of a signal-transmitting operation, a baseband digital signal is provided to the digital-to-analog converter 250 (DAC 250). The DAC 250 converts the digital signal to an analog signal that is provided the mixer 260. The mixer 260 performs a frequency conversion on the analog signal to up-convert from one frequency to a higher frequency, such as from a baseband frequency to an intermediate frequency (IF) or a radio frequency (RF). The mixer 260 can perform the frequency up-conversion in a single conversion step, or through multiple conversion steps. Thus, the mixer 260 performs a frequency up-conversion operation on the analog signal to produce an up-converted signal and provides the up-converted signal to a filter 258. The filter 258 filters (e.g., low-pass filters or bandpass filters) the up-converted signal by attenuating some ranges of frequencies to produce a filtered signal that has one or more frequency bands attenuated. The filter 258 provides the filtered signal to a power amplifier 256.

The power amplifier 256 amplifies the filtered signal to produce an amplified signal at a power level appropriate for transmission. The amplifier 256 provides the amplified signal to the switched filter 128. The switched filter 128 provides the amplified signal to the antenna 130 for transmission either via the bypass line 212 or via the filter 210 based on a control signals from a switched filter controller 132.

Although operation of the switched filter 128 with respect to surrounding components is described above in terms of an example transmission operation, the switched filter 128 can be utilized for signals flowing in the opposite direction for transmission operations using the receiver 252.

As shown, the switched filter controller 132 is implemented separately from the other illustrated components. However, the switched filter controller 132 may be implemented in an alternative manner. For example, the switched filter controller 132 can be realized as part of at least one modem 120, by the wireless transceiver 122, by another physical component such as a concurrency manager, by an air interface module, by an operating system executing on the corresponding electronic device 102, and so forth. Alternatively, the switched filter controller 132 can be distributed across two or more different components, modules, and the like, such as across multiple modems 120. In some aspects, a portion of the switched filter controller 132 may be implemented by or referred to as a processor more generally. In some implementations, at least a portion of the switched filter controller 132 is implemented by the modem 120-1. In an aspect, the switched filter controller 132 is an example of means for causing switching circuitry to selectively connect a transceiver unit 126-1 to an antenna 130 via a bypass signal path or via a filtered signal path as described in further detailed below.

The switched filter controller 132 generates at least one switch control signal 214 (SCS) based on one or more control parameters 216, or command. A modem 120 or another processing component can provide the one or more control parameters 216 to the switched filter controller 132. The switched filter controller 132 provides the switch control signal 214 (e.g., one signal, multiple signals, multiple signals over time, or multiple signals distributed over one or more signal lines simultaneously, multiple signals such as a parallel interface, multiple signals over time such as a serial interface, or combinations thereof) to the switched filter 128 to control whether a signal that is transiting across the switched filter 128 propagates via the filter 210 or the bypass line 212. The switched filter controller 132 is configured to control the switched filter 128 to balance coexistence considerations and performance considerations, as described herein. In some implementations, communication between the switched filter controller 132 and the switched filter 128 is performed in accordance with a switch control interface, such as the Mobile Industry Processor Interface (MIPI) standard or the General-Purpose Input/Output (GPIO) standard.

FIG. 2B illustrates generally at 200-2 an example filter 210 along with switching circuitry 202 that can be implemented as part of a switched filter 128 (of FIG. 2A). As illustrated, the switched filter 128 includes at least one port 220 on an antenna side of the switched filter 128 (on the left as depicted) and one port 224 on a transceiver (TRX) side of the switched filter 128 (on the right as depicted). The filter 210 is depicted as a band-rejection filter (e.g., notch filter) with a response that attenuates frequencies within a certain frequency range (e.g., rejection band). However, filters with other frequency responses may be implemented in accordance with the principles described herein.

The filter 210 performs a filtering operation with respect to one or more frequency ranges. For example, a filter 210 can suppress or reject a particular frequency portion from a frequency range as depicted. The switched filter 128 includes a bypass line 212. Although not shown, the bypass line 212 may include some signal-conditioning (or signal processing) components between port 220 and port 224 in certain implementations. In an aspect, the bypass line 212 has lower or otherwise different insertion loss for certain signals or frequencies as compared to that of the filter 210. The switched filter 128 includes switching circuitry 202 for controlling whether an input signal propagates over the bypass line 212 or through the filter 210. The switching circuitry 202 is controlled by the switched filter controller 132 (of FIG. 2A). In an aspect, the switching circuitry 202 is an example of switching means. The dashed lines in FIG. 2B illustrate the variability of the different paths along which the signal may travel (e.g., via the bypass line 212 or through the filter 210) based on the configuration of the switching circuitry 202.

In an example signal-transmission operation, the filter 210 accepts a wireless signal at the port 224 when controlled by the switching circuitry 202 so that the signal path is through the filter 210. The filter 210 performs a filtering operation in accordance with a first band to produce a filtered signal. Here, the first band may comprise an interrupted band that spans a range of frequencies from a lower frequency to an upper frequency, except for those frequencies in an interrupted range. The filter 210 outputs the filtered signal via the port 220. The filtered signal is provided to the antenna 130 coupled to the port 220. As illustrated, the first filtering operation performs a band-rejection filtering operation as indicated by the band-rejection frequency response. In certain aspects, the rejection frequency range of the filter 210 may correspond to a frequency range either adjacent to a frequency range of the signal passing through the switched filter 128 or a frequency range with which the signal passing through the switched filter 128 is interfering. For example, the signal passing through the switched filter 128 may have a center frequency within a band that corresponds to cellular technology (WWAN) such as a 5G/LTE 3GPPP standard. The rejection band of the filter 210 may overlap with a frequency that corresponds to Wi-Fi technology (WLAN) or an IEEE 802.11 standard.

As an example, the filter 210 can be implemented with or using at least one electro-acoustic component. Examples of electro-acoustic components include surface acoustic wave (SAW) filter components, bulk acoustic wave (BAW) filter components (e.g., FBAR, SMR-BAW, guided bulk acoustic wave (GBAW) filter components), and so forth. Other filter types may be possible as well.

Figure 3A:
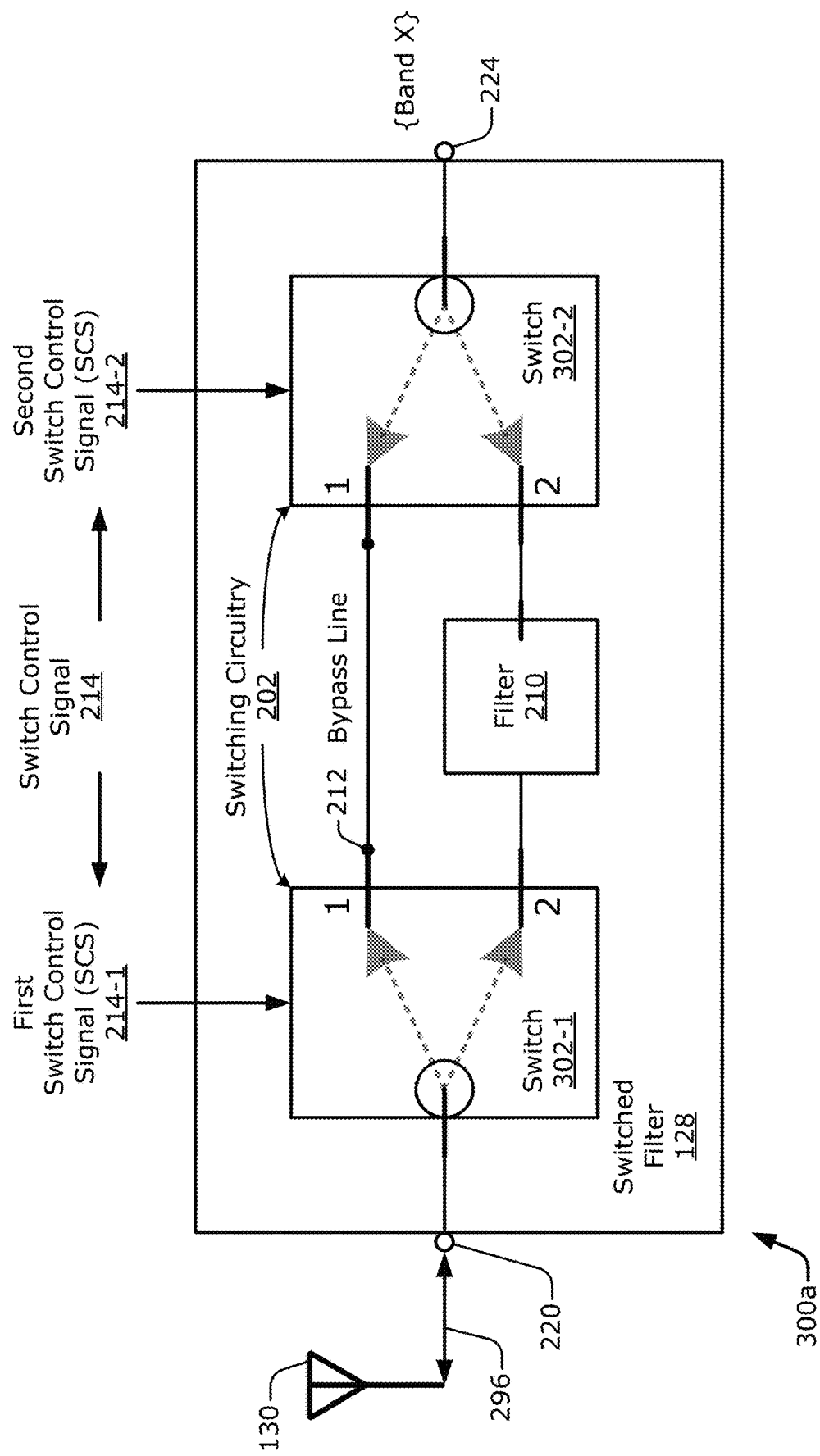
FIG. 3A is a schematic diagram illustrating an example switched filter.

FIG. 3A is a schematic diagram 300a illustrating an example switched filter 128. Here, the switching circuitry 202 includes a first switch 302-1 and a second switch 302-2. The switch control signal 214 includes a first switch control signal 214-1 and a second switch control signal 214-2. In operation, the first switch 302-1 is configured to be responsive to the first switch control signal 214-1, and the second switch 302-2 is configured to be responsive to the second switch control signal 214-2.

The first switch 302-1 includes a pole (on the left or antenna side), a first throw (1), and a second throw (2). Thus, the first switch control signal 214-1 controls whether the pole of the first switch 302-1 is connected to the first throw (1) or the second throw (2) of the first switch 302-1. The second switch 302-2 includes a first throw (1), a second throw (2), and a pole (on the right or TRX side). Thus, the second switch control signal 214-2 controls whether the pole of the second switch 302-2 is connected to the first throw (1) or the second throw (2) of the second switch 302-2.

As shown, the port 220 of the switched filter 128 is coupled to the pole of the first switch 302-1. The first throw (1) of the first switch 302-1 is coupled to the first throw (1) of the second switch 302-2 via the bypass line 212. The bypass line 212 can be implemented using a wire, a conductive strip, etc. on an integrated circuit or an electroacoustic chip; a trace on a printed circuit board (PCB), a laminate, or a high temperature co-fired ceramic (HTCC) or low temperature co-fired ceramic (LTCC) carrier; and so forth. In an aspect, the bypass line 212 may be an example of a means for bypassing the filter 210. The bypass line 212 can include a buffer, a signal booster, and the like to condition the wireless signal 296 that is not propagating through the filter 210. In an aspect, the bypass line 212 has a lower or otherwise different insertion loss for certain signals or frequencies as compared to that of the path using the filter 210. The second throw (2) of the first switch 302-1 is coupled to the filter 210. The filter 210 is coupled to the second throw (2) of the second switch 302-2. The pole of the second switch 302-2 is coupled to the port 224 of the switched filter 128. While described in terms of throws and poles, this terminology does not necessarily imply a particular type of switch or switch configuration. Rather, it should be appreciated that a variety of switch configurations (using transistors and the like) are contemplated and may be operated in a way to cause the signal to pass through either the bypass line 212 or the filter 210 based on a switch control signal 214 (or one or more switch control signals such as using MIPI or other GPIO protocol).

The switching circuitry 202 is configured to selectively connect the port 224 of the switched filter 128 to the port 220 via the bypass line 212 or via the filter 210. Example switch positions for the first switch 302-1 and the second switch 302-2 to support these configurations or modes are described with reference to FIGS. 4A and 4B.

Figure 3B:
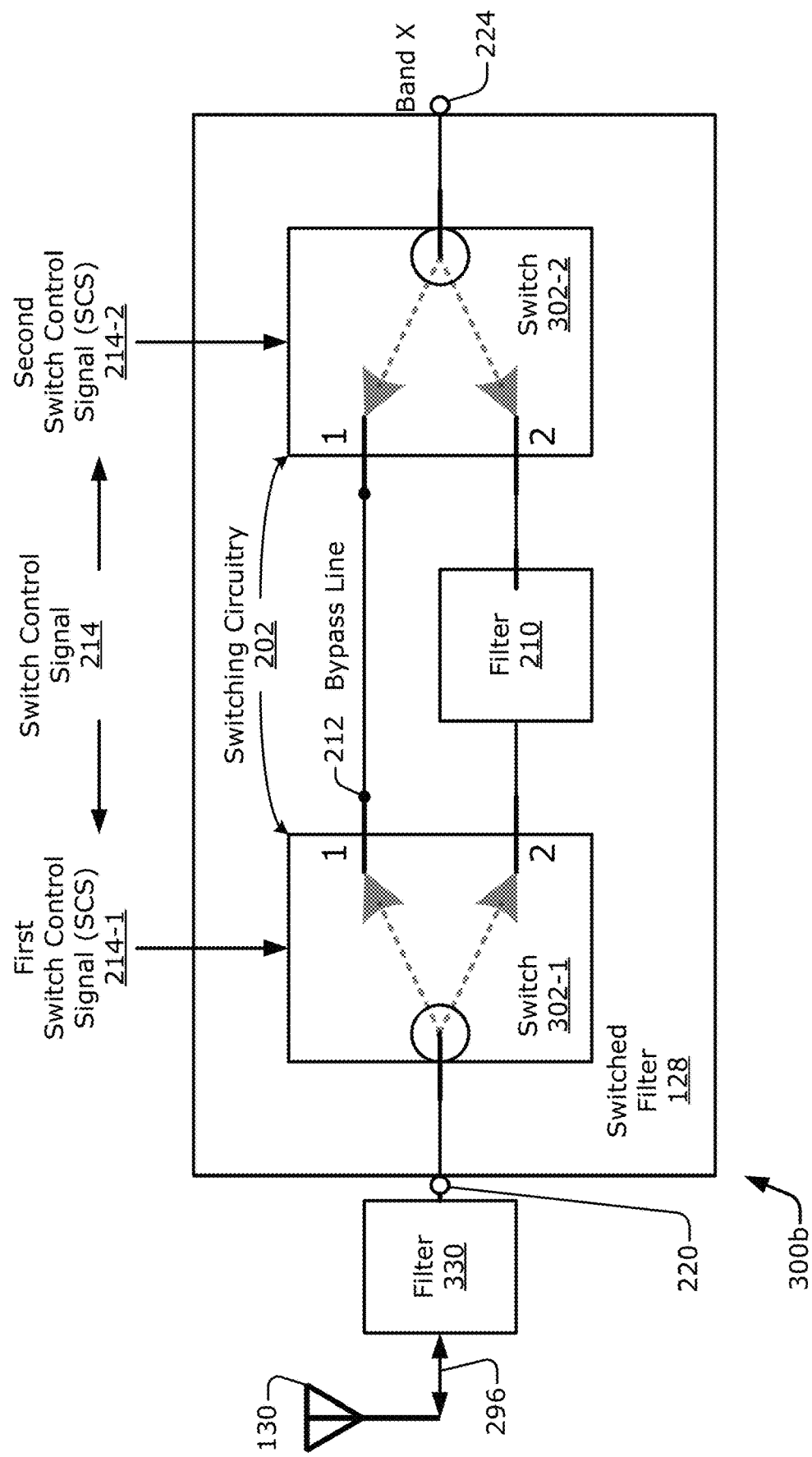
FIG. 3B is a schematic diagram illustrating an example of another switched filter.

FIG. 3B is a schematic diagram 300b illustrating another example switched filter 128. All of the elements of FIG. 3A are included and in addition, a second filter 330 is included that is coupled between the antenna 130 and the port 220 (e.g., in a common path). The second filter 330 may have a lower performance (e.g., in terms of the amount of attenuation in the rejection band, the steepness of filter skirts, quality factor, selectivity, and the like) and be less selective as compared to the filter 210. The second filter 330 in the common path may provide basic rejection to enable coexistence with systems at larger frequency offsets for which a lower performance filter is adequate and in some cases may be a wider band filter (e.g., as compared to filter 210). The second filter 330 may also potentially suppress harmonics from the power amplifier 256. When the higher performance filter 210 is switched in, the transceiver 122 may benefit from the combined rejection of the second filter 330 and the higher Q (quality factor) filter 210 which may enable coexistence with the adjacent band. As such, the second filter 330 may have a lower quality factor (Q-factor) than the higher performance filter 210. A second alternative implementation may include the lower performance second filter 330 in the bypass path 212. The lower performance second filter 330 would similarly be designed to enable coexistence with systems at larger frequency offsets and suppress the harmonics of power amplifier 256. The second filter 330 may have a lower insertion loss than the filter 210. In some cases, the second filter 330 is built from a different technology than the filter 210. For example, the second filter 330 may be an LTCC filter which may be lower cost, lower performance, but having a relatively low insertion loss (and may be wideband as compared to the filter 210 in some implementations). The filter 210 in some implementations may be a micro-acoustic filter and may have higher sensitivity and increased performance (and may have higher insertion loss). In some implementations the second filter 330 is included within the switched filter 128 and be included between port 220 and the first switch 302-1 (e.g., or may be integrated in a common package with the filter 210).

Figure 3C:
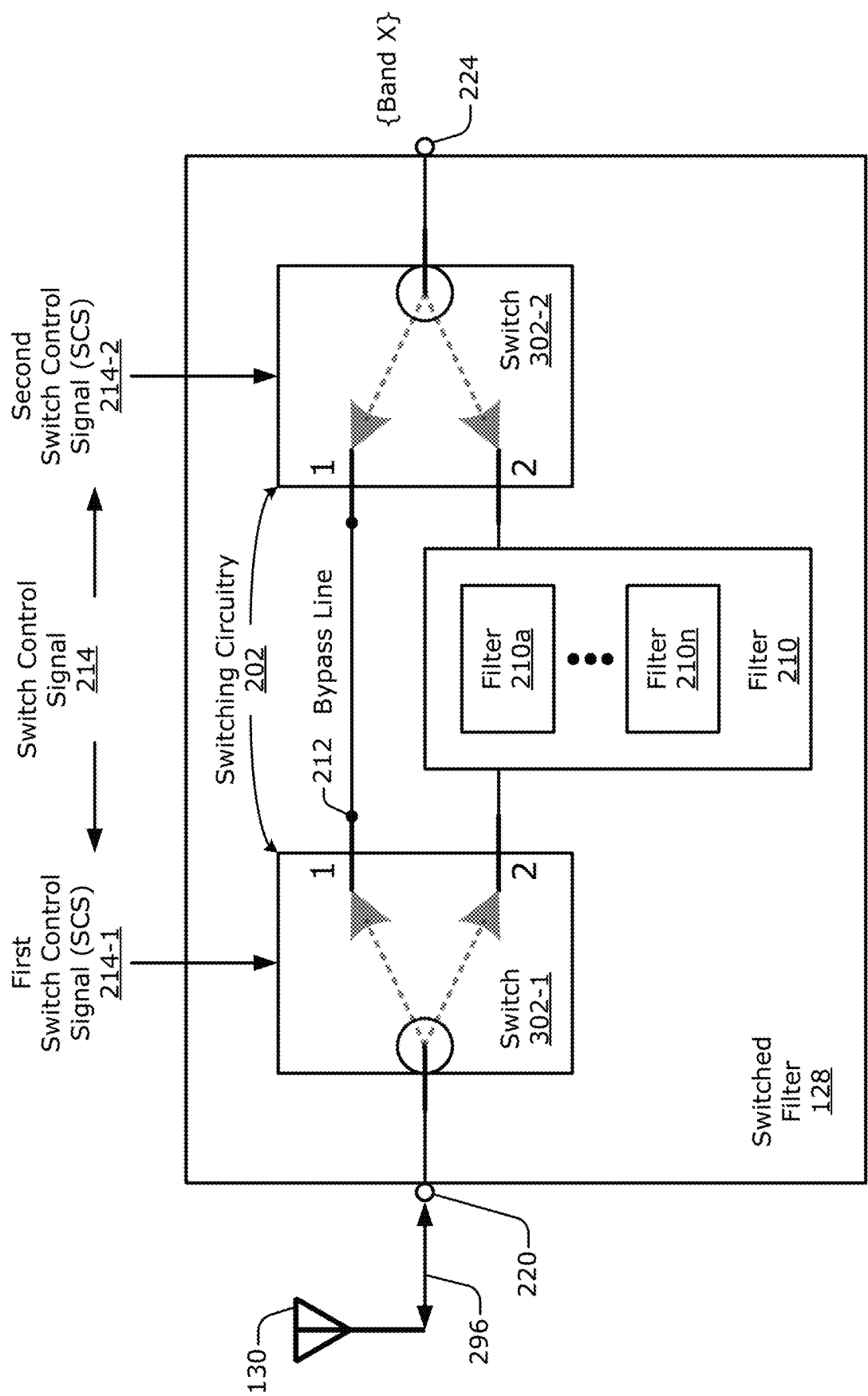
FIG. 3C is a schematic diagram illustrating an example of another switched filter.

FIG. 3C is a schematic diagram 300c illustrating another example switched filter 128. The switched filter 128 of FIG. 3C includes all the elements of FIG. 3A and depicts the filter 210 having multiple filters 210a to 210n. The diagram 300c is intended to illustrate either that the filter 210 may be tunable (e.g., its rejection or passband may be shifted) or otherwise other characteristics that may impact insertion loss/performance of the filter 210 may be tunable. As illustrated, in some implementations there may be a bank of filters 210a to 210n that may have different characteristics to either shift the frequency range of the filtering function or otherwise have different insertion losses for different performances (e.g., trading off performance for insertion loss for each particular filter 210a to 310n). As such, the switched filter 128 may be configured to switch between different filters 210a to 210n based on current operating conditions to achieve the needed isolation but while balancing insertion loss. While shown as a bank of filters 210a to 210n, the disclosure contemplates the filter 210 may be another type of dynamically tunable filter that based on various control signals or other electrical signals may adjust one or more characteristics of the filter 210.

Figure 4A:
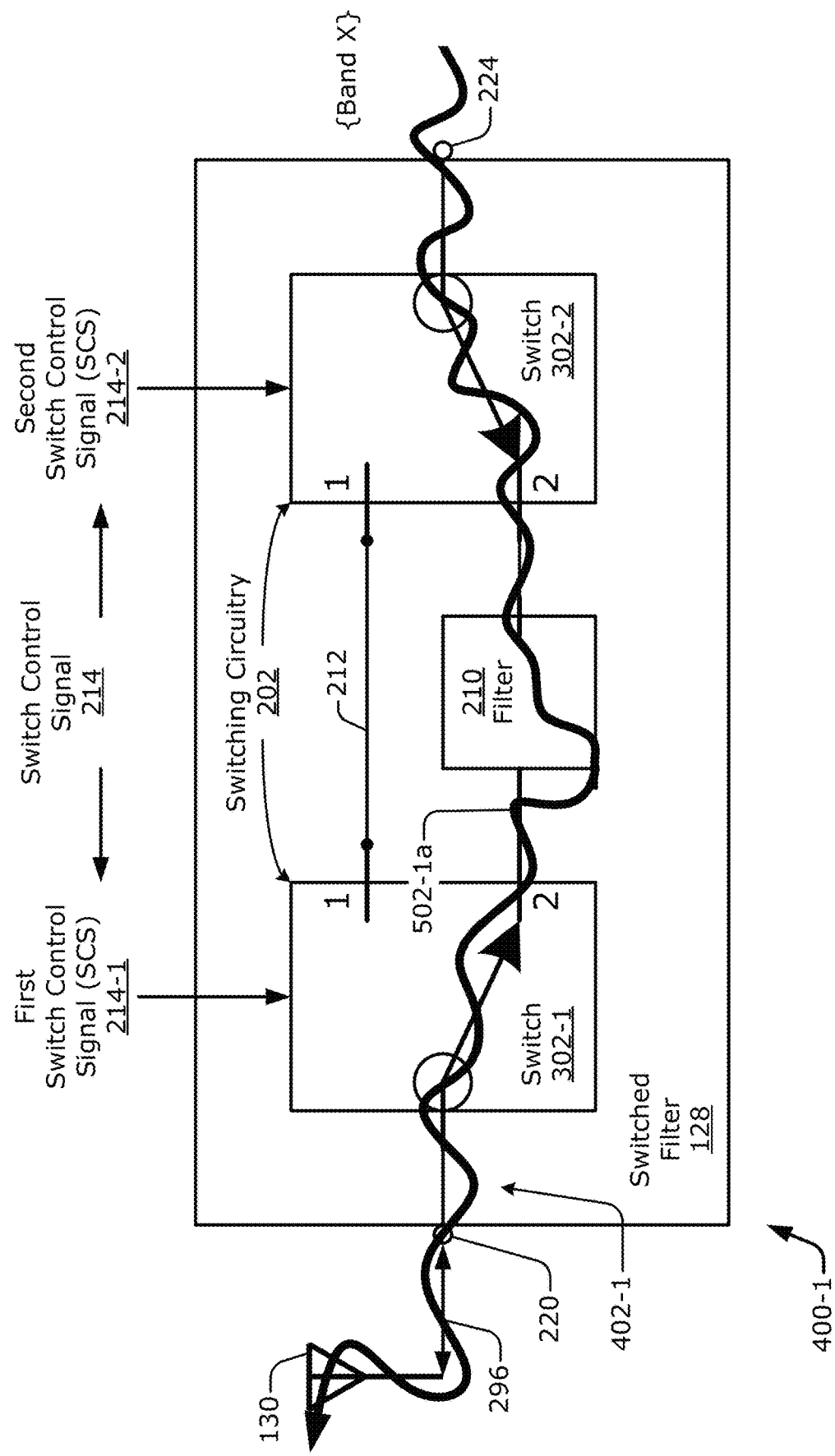
FIG. 4A illustrates a switched filter as in FIG. 3 that depicts an example filtered signal path for a filtered mode.

FIG. 4A illustrates generally at 400-1 a switched filter 128 as in FIG. 3A that depicts an example filtered signal path 402-1 for a filtered mode. To realize the filtered signal path 402-1, the switch control signal 214 controls the switching circuitry 202. The first switch control signal 214-1 causes the first switch 302-1 to connect the pole thereof to the second throw (2) thereof. The second switch control signal 214-2 causes the second switch 302-2 to connect the second throw (2) thereof to the pole thereof. Consequently, the signal path 402-1 passes through the filter 210 (e.g., from the port 224 through the filter 210 to the port 220 for a transmission signal). In one example implementation for purposes of illustration only, the band for the signal corresponds to a cellular technology while providing isolation to protect a band in Wi-Fi or WLAN technology using the filter 210.

Figure 4B:
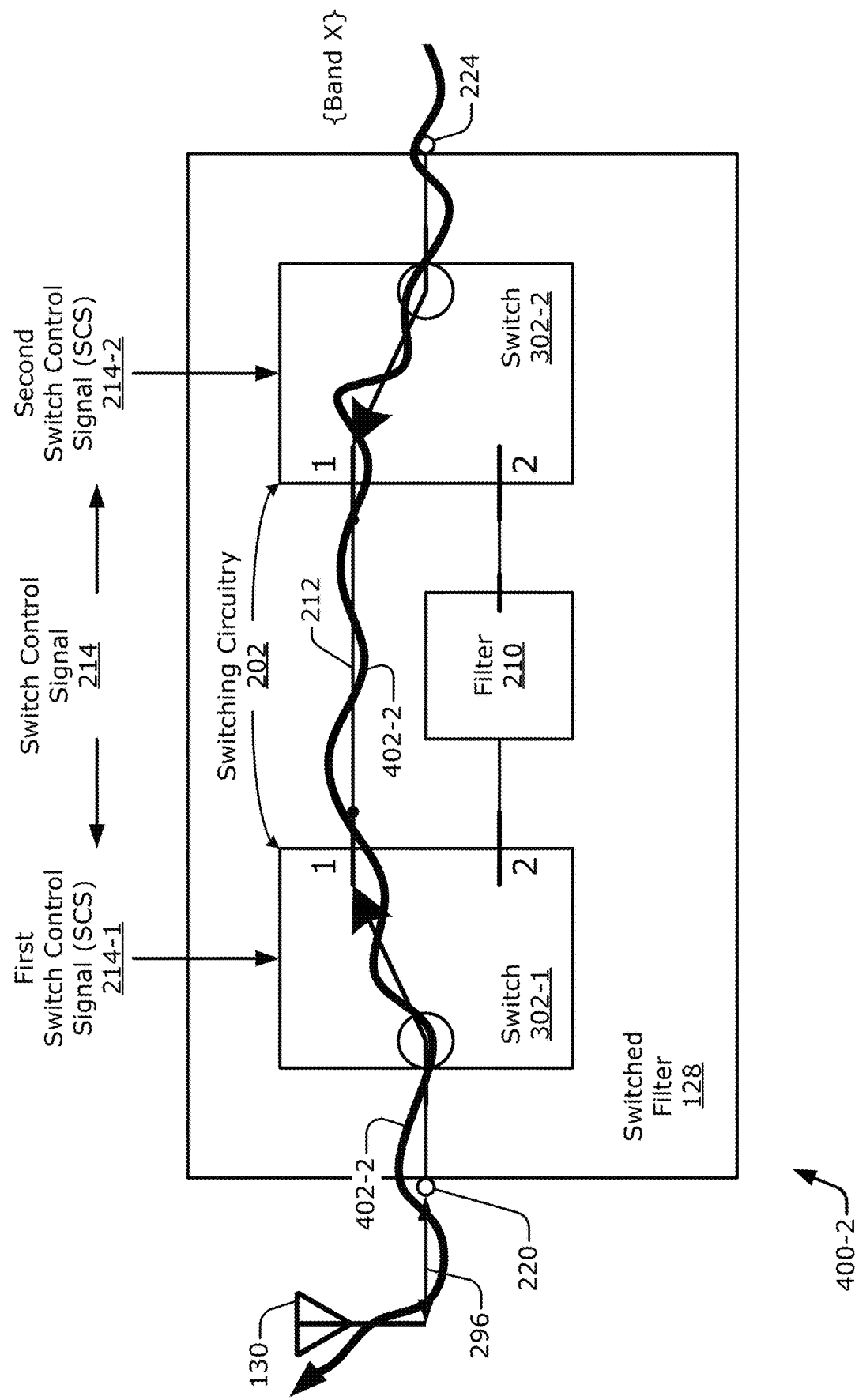
FIG. 4B illustrates a switched filter as in FIG. 3 that depicts an example bypass signal path for a bypass mode.

FIG. 4B illustrates generally at 400-2 a switched filter 128 as in FIG. 3 that depicts an example bypass signal path 402-2 for a bypass mode. In this example, the switched filter 128 establishes or provides the bypass signal path 402-2. To realize the bypass signal path 402-2, the switch control signal 214 controls the switching circuitry 202. The first switch control signal 214-1 causes the first switch 302-1 to connect the pole thereof to the first throw (1) thereof. The second switch control signal 214-2 causes the second switch 302-2 to connect the first throw (1) thereof to the pole thereof.

Consequently, the bypass signal path 402-2 extends through the bypass line 212. As used herein, a port may comprise an "input port" at one moment for one communication operation and an "output port" at another moment for another communication operation. For example, with a signal-transmitting operation, the first port 224 comprises an input port of the switched filter 128. However, with a signal-receiving operation, the port 224 comprises an output port of the switched filter 128 because signals are traveling in the opposite direction for signal receiving operations.

Figure 5:
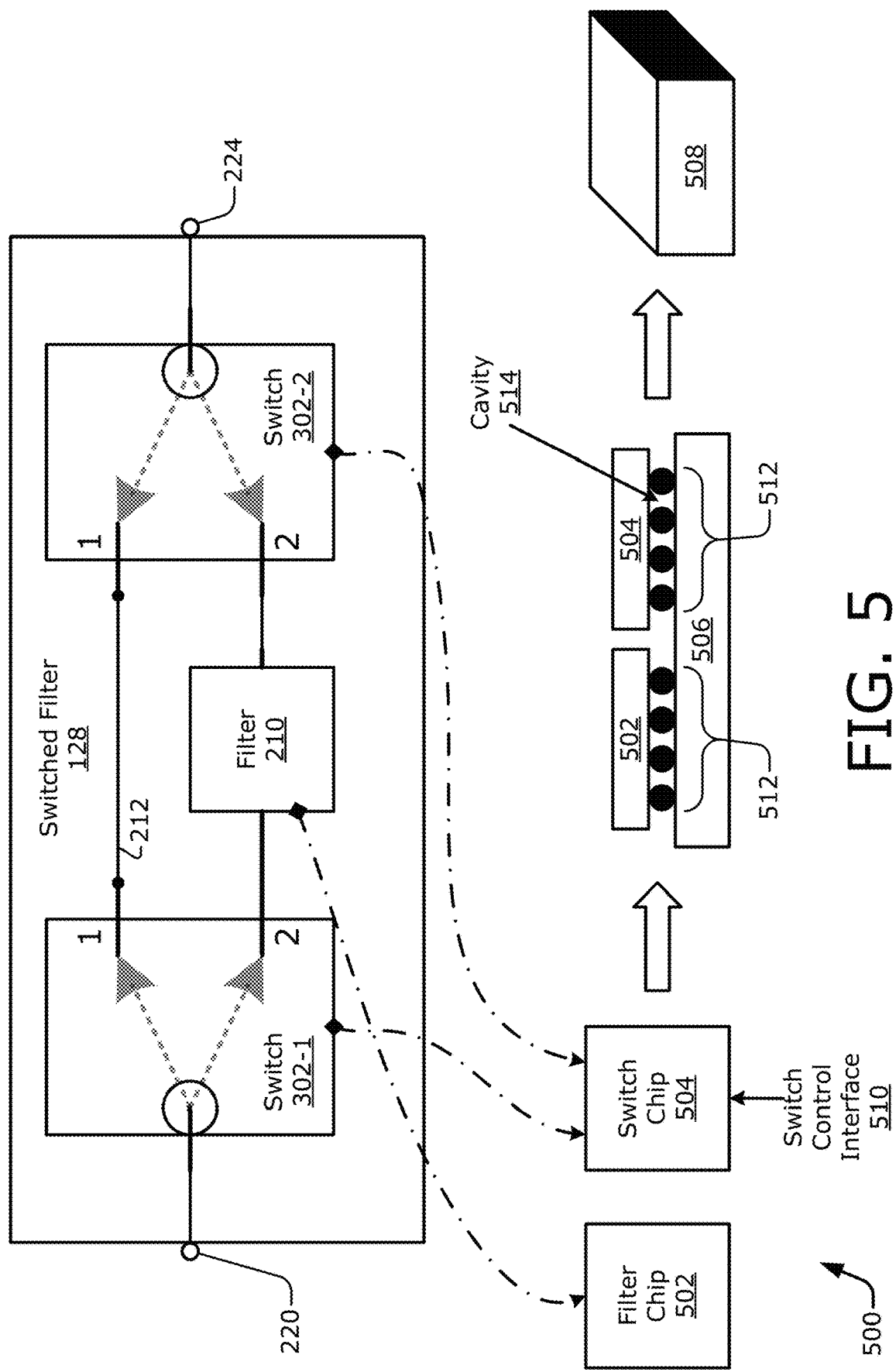
FIG. 5 illustrates an example approach to packaging and otherwise realizing the switched filter as part of an electronic device.

FIG. 5 illustrates, generally at 500, an example approach to packaging and otherwise realizing the switched filter 128 as part of an electronic device 102. In FIG. 5, the switched filter 128 is manufactured into one package 508 that includes two chips. The filter 210 is fabricated on a filter chip 502, which may be at least partly made of an electro-acoustic material such as lithium niobate, lithium tantalite, or aluminum nitride, lithium tantalate, quartz, or the like. The first switch 302-1 and the second switch 302-2 are fabricated together on a switch chip 504. The switch chip 504 includes a switch control interface 510 (e.g., MIPI or GPIO) for communicating the switch control signal 214 (e.g., of FIGS. 2A, 2B, and 3). The filter chip 502 and the switch chip 504 are secured to a support structure 506, such as a rigid or flexible printed circuit board (PCB), a laminate, or an HTCC or LTCC carrier. The filter chip 502 and the switch chip 504 are secured to the support structure 506 using an electrically-coupling mechanism 512, such as at least one ball grid array (BGA), one or more solder bumps, one or more stud bumps, one or more copper pillars, and so forth. The filter chip 502, the switch chip 504, and the support structure 506 are then encapsulated in the package 508, such as a chip-sized SAW (surface acoustic wave) package (CSSP).

Electroacoustic filter components, such as a chip including SAW, BAW, and/or GBAW filter structures, may be deployed with a cavity that separates the filter structures from other structures that might dissipate acoustic energy. To that end, the corresponding electroacoustic filter chip may carry the sensitive electroacoustic filter components on one surface. The electroacoustic filter chip may be arranged in a flip-chip configuration in which the electroacoustic filter chip is electrically and mechanically connected to the carrier substrate. An accompanying IC chip may be disposed next to the electroacoustic filter chip on the carrier substrate. A sealing bulk material (e.g., glob top) may be used to hermetically seal and mechanically protect the chips on the carrier substrate. Then, the electroacoustic filter chip and the IC chip are embedded within a glob top material, e.g., within a molding mask.

Bump connections establishing electrical and physical connection between the electroacoustic filter chip and the carrier substrate may provide a distance between the carrier substrate and the electroacoustic filter chip to obtain a cavity 514. To prevent the glob top material from entering the cavity between the electroacoustic chip and the carrier substrate, a foil can be arranged that covers a top side of the electroacoustic filter chip, side portions of the electroacoustic filter chip, a vertical distance between the electroacoustic filter chip and the carrier substrate, and a top surface of the carrier substrate at least in the vicinity of the electroacoustic filter chip. The IC chip can also be arranged in a flip-chip-configuration. The foil can further cover the IC chip.

A lateral dimension of the glob top material and of the carrier substrate may be substantially identical. The lateral area and/or the lateral dimensions of the carrier substrate may be essentially the same as a sum of the area of the electroacoustic filter chip and the IC chip. In an example, a corresponding module can comprise the electroacoustic filter chip in a bare die configuration. A package of such a module is known as a chip-size SAW package (CSSP) in the field of electroacoustic filter chips. The package 508 may then be integrated with and connected to other components within a transmit or receive chain either as part of a module or as a stand-alone component. In some aspects, the switch chip 504 may be included as part of another component or package.

As a result, in certain implementations, the switched filter 128 is integrated into a package 508, where the filter 210 includes an electroacoustic filter packaged with one or more switches of the switching circuitry 202.

Coexistence Management Using the Switched Filter

As noted above, demands for larger data rates and increased throughput have pushed development of wireless protocols, such as the 5G New Radio protocol, to specify additional frequency bands along with wider modulation bandwidths. As one example for illustration purposes, the 5G NR protocol supports carrier bandwidths as wide as 100 MHz as compared to 20 MHz for the LTE protocol. The wider bandwidths can cause higher adjacent channel power (ACP) levels and/or intermodulation distortion such as IM3 and IM5 distortion that extends into neighboring bands (or into bands which are at harmonics of the signal) desensing collocated receivers in an electronic device. In a particular example, a 5G NR band defined between 2496 MHz and 2690 MHz (designated as n41) that uses a carrier signal with a 100 MHz bandwidth may increase desense in the neighboring Wi-Fi band (defined between 2400 MHz and 2483 MHz (e.g., 2.4 GHz band)) by potentially 40 dB when compared to a 20 MHz bandwidth of the LTE band 41 defined between 2496 MHz and 2690 MHz (B41). Note that band frequency range definitions such as those defined above may vary slightly by geography. In addition, even when the carrier bandwidth is lower than 100 MHz such as 60 MHz or 40 MHz, if the center frequency of the carrier signal is at the lower end of the n41 band, undesirable levels of distortion in the Wi-Fi band may still occur unless further isolation is provided.

The 5G NR sub-6 GHz newly defined bands also create additional coexistence challenges. For example, the 5G NR defined bands of 3300 MHz to 4200 MHz (designated as n77) and 4400 MHz to 5000 MHz (designated as n79) may create coexistence issues. Particularly, the guard band between n79 and 5 GHz WLAN may be on the order of 150 MHz in some cases (as compared to previously with LTE where the closest LTE band to 5 GHz Wi-Fi band (defined between 5150 MHz and 5850 MHz) was B43 (between 3600 MHz and 3800 MHz) which allowed a guard band of 1350 MHz between LTE and 5 GHz Wi-Fi). The new 150 MHz guard band may be insufficiently large to effectively isolate the two systems (e.g., using low cost LTCC filters) which may result in interference between the 5 GHz Wi-Fi and the n79 systems in the absence of further isolation measures.

To address these coexistence challenges and prevent distortion from impacting adjacent or other frequency bands, additional filtering can be provided to increase isolation. For example, a notch filter (e.g., band rejection filter) may be added between the antenna 130 and the power amplifier 256 configured for transmitting a carrier signal using the n41 band. The rejection band of the notch filter may be configured to be within the Wi-Fi 2.4 GHz band to filter out unwanted frequency content in the Wi-Fi band to prevent desense of the Wi-Fi receiver. But as noted above, the addition of additional filtering generally increases insertion loss which decreases transmit power and reduces receive sensitivity. For example, in certain instances adding a filter with the desired isolation characteristics could add 2 to 3 dB of insertion loss.

In addition, modulation bandwidths and selected frequency bands/channels are dynamic (e.g., changing based on either geographic location and/or based on changing network conditions). For example, based on the operating conditions, the bandwidth of the carrier signal may be less than 100 MHz (e.g., at 20 MHz) or the center frequency of the carrier signal within the band may be in the upper part of the n41 band. In these scenarios, the inherent roll-off of the carrier signal based on the design of the transmit chain may be sufficient and additional isolation with respect to the Wi-Fi 2.4 GHz band is unnecessary. In this case, and in other scenarios/combinations of bandwidths and operating frequencies, the additional filtering would create unnecessary losses and may be undesirable.

In accordance with aspects of the disclosure, therefore, with reference to FIGS. 2-5, a switched filter 128 may be provided that includes a filter 210 and a bypass line 212 along with switching circuitry 202 that is controlled to selectively provide a filtered signal path or a bypass signal path. In accordance with certain aspects, the switched filter controller 132 (that may be implemented in part by the modem 120-1 or transceiver 122) may be able to determine whether to cause a carrier signal to flow through either the bypass line 212 or through the filter 210 based on current operating conditions. Certain aspects of the disclosure describe how the switched filter controller 132 may use various system level information uniquely available to an end-to-end RF front-end system that are leveraged in various combinations to determine when to use the filtered signal path or the bypass signal path to optimize performance while enabling coexistence between different wireless protocols. While using the additional filtering may result in additional insertion loss (e.g., in the range of 2 dB to 3 dB), a bypass signal path may have significantly less insertion loss (e.g., on the order of 0.3 to 0.4 dB) and can be leveraged when the system determines additional isolation is unnecessary.

For example, the modem 120-m has information about the current carrier frequency and carrier bandwidth for a carrier signal in a particular band (e.g., the current operating carrier signal being used or about to be used by the electronic device 102). Based on the band and the carrier bandwidth of the carrier signal, the switched filter controller 132 as a part of the modem 120-m (or receiving this information from the modem 120-m) may use the information to determine whether additional RF rejection is desirable to enhance coexistence. If additional RF rejection is desirable, then the switched filter controller 132 provides control signals 214 to the switching circuitry 202 to cause the transceiver unit 126-1 to be coupled to the antenna 130 via the filtered signal path. Alternatively, for smaller carrier bandwidths or large frequency offsets between bands where additional rejection is unnecessary, the switched filter controller 132 provides control signals 214 to the switching circuitry 202 to cause the carrier signal to cause the transceiver unit 126-1 to be coupled to the antenna 130 via the bypass signal path.

Figure 6:
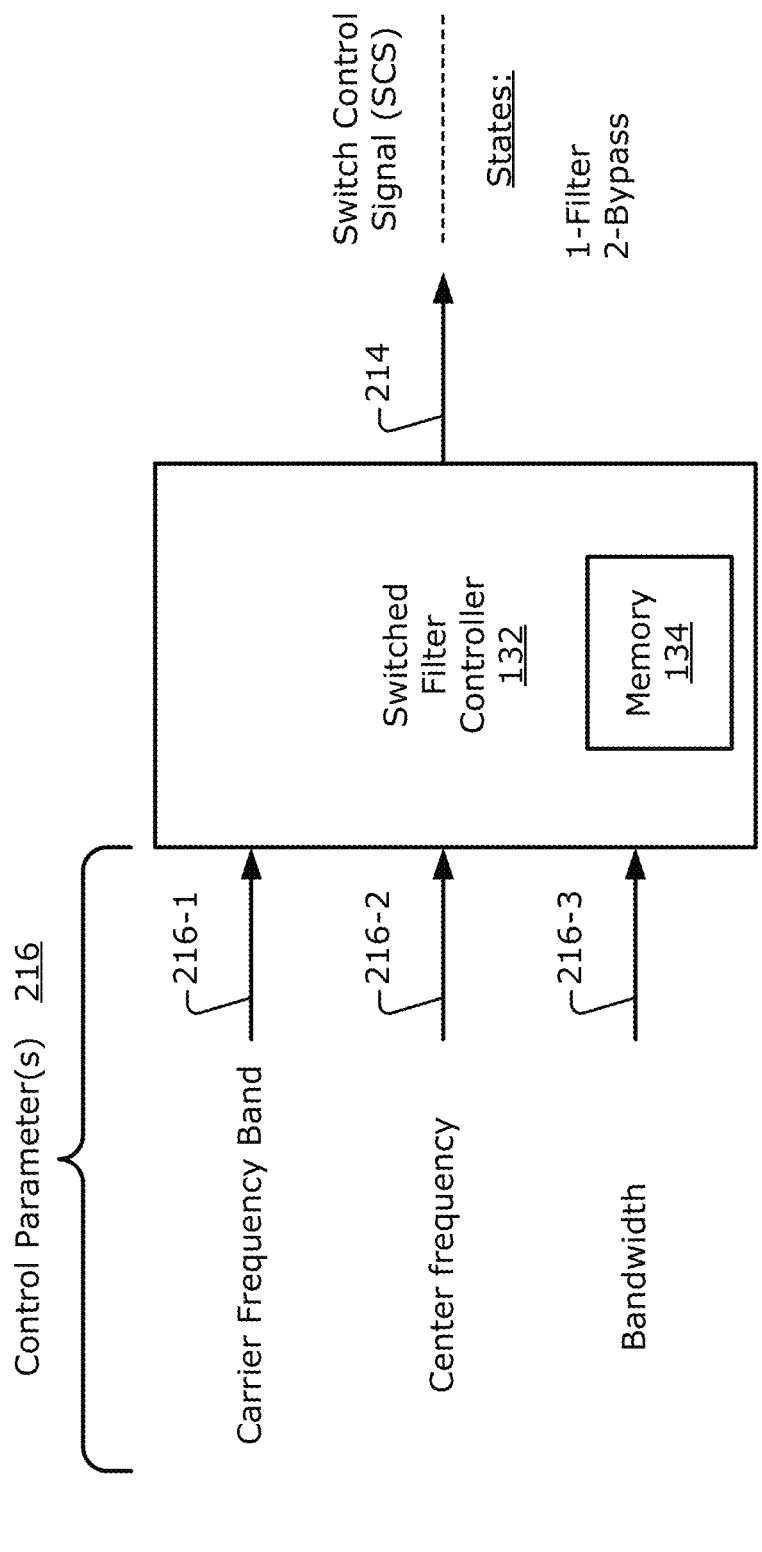
FIG. 6 illustrates an example implementation for a switched filter controller for enhanced coexistence management.

FIG. 6 illustrates generally at 600 an example implementation for a switched filter controller 132 for enhanced coexistence management. The switched filter controller 132 accepts as input one or more control parameters 216 and provides as output at least one switch control signal 214. In some implementations, each of the one or more control parameters 216 can correspond to a carrier frequency band, a center frequency of a carrier signal, and a bandwidth of a carrier signal, some combination thereof, and so forth. In the example 600, the first control parameter 216-1 corresponds to a carrier frequency band (e.g., n41 as one example for illustrative purposes). The second control parameter 216-2 corresponds to a center frequency of a carrier signal within the carrier frequency band. The third control parameter 216-3 corresponds to a bandwidth of the carrier signal (e.g., 100 MHz, 40 MHz, 20 MHz, etc.). Other example of the one or more control parameters 216 are described below.

Based on at least one of the one or more control parameters 216, the switched filter controller 132 produces the switch control signal 214. The switch control signal 214 is provided to a switched filter 128, such as the switched filter 128 of FIGS. 2-5. The switch control signal 214 is indicative of a state of the switched filter 128. Example states include, a filter state and a bypass state. The switch control signal 214 can be issued to the switching circuitry 202 (e.g., of FIG. 2A) of at least one switched filter 128.

The switched filter controller 132 may be implemented all or in part by a processor. The processor may correspond to, for example, a modem, a digital signal processor (DSP), a controller, an application processor, a multi-core processor, a general-purpose processor, and so forth. All or part of the switched filter controller 132 may be implemented by the modem 120-m as shown in FIG. 2A or in the transceiver 122. The modem 120-m may also be implemented as a digital signal processor (DSP), a controller, an application processor, a multi-core processor, a general-purpose processor, and so forth. The switched filter controller 132 may include a memory 134 (e.g., similar as described with respect to FIG. 1) that stores instructions or other data structures to allow the switched filter controller 132 to make a determination between the filter and bypass states. For example, the memory 134 may store a look-up-table (LUT) that provides a filter or bypass state for different combinations of the one or more control parameters 216. As a more particular example, a LUT may be provided which is referenced by the switched filter controller 132 and that provides a bypass or filter state based on each combination of center frequency and bandwidth, etc.

In accordance with the above, with reference to FIGS. 2A, 2B, and 6, to provide enhanced coexistence management, a wireless communication apparatus includes a switched filter 128 coupled to an antenna 130. The switched filter 128 includes a filter 210 and a bypass line 212. The switched filter 128 includes switching circuitry 202 coupled to the filter 210 and the bypass line 212. The switching circuitry 202 is configured to selectively establish a bypass signal path including the bypass line 212 or a filtered signal path including the filter 210. The wireless communications apparatus further includes a transceiver unit 126-1 coupled to the antenna 130 via the switched filter 128. The transceiver unit 126-1 is configured to process a carrier signal transmitted or received via the antenna 130. The wireless communications apparatus further includes a switched filter controller 132 coupled to the switching circuitry 202. The switched filter controller 132 is configured to cause the switching circuitry 202 to selectively connect the transceiver unit 126-1 to the antenna 130 via the bypass signal path or via the filtered signal path based at least on a frequency band of the carrier signal and a bandwidth of the carrier signal.

In certain implementations, the filter 210 is a notch filter (e.g., band reject filter) having a frequency rejection band that is in a frequency band in which the carrier signal is creating interference (e.g., the rejection band is in a different frequency band than the carrier signal band but for which the carrier signal may cause interference). In certain implementations, the frequency rejection band is adjacent to the frequency band of the carrier signal.

As an example, when making a filter/bypass determination based on the frequency band and the bandwidth of the signal, for larger carrier signal bandwidths and/or smaller frequency offsets between two coexisting wireless protocols, the switched filter controller 132 is configured to cause the switching circuitry 202 to selectively connect the transceiver unit 126-1 to the antenna 130 via the filtered signal path because additional RF rejection may be desirable in this case to avoid interference. Likewise, for smaller carrier bandwidths and/or larger frequency offsets where additional rejection is not necessary, the switched filter controller 132 is configured to cause the switching circuitry 202 to selectively connect the transceiver unit 126-1 to the antenna 130 via the bypass signal path via the bypass line 212. In a particular example, where the bandwidth of a carrier signal is 100 MHz as defined by the 5G NR protocol, and the frequency band of the carrier signal is adjacent to another band of a concurrently operating wireless protocol (e.g., Wi-Fi), the switched filter controller 132 is configured to cause the switching circuitry 202 to selectively connect the transceiver unit 126-1 to the antenna 130 via the filtered signal path using the filter 210. In another scenario, the bandwidth of the carrier signal may be 100 MHz, but the frequency band of the carrier signal is offset from a band used by a coexisting wireless protocol such that a sufficient guard band exists. In this case, the bypass signal path via the bypass line 212 may be selected. In yet another scenario, the bandwidth of the carrier signal may be 20 MHz in a frequency band adjacent to a concurrently operating frequency band from another wireless protocol. But a 20 MHz bandwidth may be sufficiently low to reduce interference issues. In this case, the bypass signal path via the bypass line 212 may be selected.

More generally, in certain aspects the switched filter controller 132 is configured to cause the switching circuitry 202 to selectively connect the transceiver unit 126-1 to the antenna 130 via the bypass signal path in response to determining that an interference level is lower than a threshold interference level based on the frequency band and the bandwidth of the carrier signal. The interference level and interference threshold may be determined for different combinations of the one or more control parameters 216 described above or below. Likewise, the switched filter controller 132 is configured to cause the switching circuitry 202 to selectively connect the transceiver unit 126-1 to the antenna 130 via the filtered signal path in response to determining that an interference level is above a threshold interference level based on the frequency band and the bandwidth of the carrier signal. In particular, the switched filter controller 132 may be configured to cause the switching circuitry 202 to selectively connect the transceiver unit 126-1 to the antenna 130 via the filtered signal path in response to determining that the bandwidth of the carrier signal is above a threshold bandwidth, and configured to cause the switching circuitry 202 to selectively connect the transceiver unit 126-1 to the antenna 130 via the bypass signal path in response to determining that the bandwidth of the carrier signal is below a threshold bandwidth.

Center Frequency

In addition to the frequency band and the carrier signal bandwidth, the center frequency of the carrier signal within the frequency band may be used by the switched filter controller 132 to determine whether to use the bypass signal path or the filtered signal path. In this case, the center frequency may refer to the center frequency of the channel within the band being used as opposed to the center point frequency of the band. For example, a carrier signal may have a particular bandwidth that is lower than the overall band (e.g., 20 MHz bandwidth in the n41 band that spans almost 200 MHz). In this case, the carrier signal may operate at different frequencies (e.g., use different channels) within the band as long as the center frequency of the carrier signal is within the band (and generally such that the based on the bandwidth the carrier signal stays within the edge of the band).

The switched filter controller 132 is configured to cause the switching circuitry 202 to selectively connect the transceiver unit 126-1 to the antenna 130 via the bypass signal path or via the filtered signal path based further on a location of a center frequency of the carrier signal within the frequency band. In this case, the switched filter controller 132 determines, based on a combination of the bandwidth and location of the center frequency of the carrier signal within the frequency band, whether the bypass signal path or filtered signal path should be used. For example, the n41 frequency band may extend up to 2690 MHz. Even if the bandwidth of the carrier signal is 100 MHz, if the center frequency of the carrier signal is above, e.g., 2600 MHz, the isolation with respect to the 2.4 GHz Wi-Fi band may be sufficient that additional filtering is not needed. In this case, the switched filter controller 132 determines that the center frequency of the carrier signal is above a threshold within a frequency band, regardless of the bandwidth, and is configured to cause the bypass signal path to be used. In another case, both the center frequency and the operating bandwidth are used to determine whether or not the bypass signal path or the filtered signal path is selected. For example, if the current carrier signal bandwidth is 40 MHz then for certain center frequencies within the band above a threshold, the switched filter controller 132 is configured to cause the bypass signal path to be selected. Below the threshold, the switched filter controller 132 is configured to cause the filtered signal path to be selected for applicable center frequencies. As such, for each bandwidth there may be certain center frequency thresholds above (or below depending on the relative location of the adjacent band for which coexistence is desired) which the switched filter controller 132 is configured to cause the bypass signal path to be selected (and below (or above) a threshold in which the filtered signal path is selected).

With respect to the carrier signal as described herein, in certain implementations the band in which the carrier signal is operating may be referred to as the aggressor band as it is the band that may potentially cause interference with another band referred to as the victim band as it is the band in which interference is being introduced. As such there may be an aggressor band or aggressor carrier signal that is potentially causing interference and a victim band or victim carrier signal that is being interfered with.

FIG. 7 is a table 700 that illustrates an example of different combinations of carrier signal bandwidths and center frequencies that correspond to different selections of either the filtered signal path or the bypass signal path by the switched filter controller 132. The switched filter controller 132 may include a similar table 700 (e.g., LUT) in memory 134 that causes the switched filter controller 132 to determine whether to select the bypass signal path or the filtered signal path based on the current center frequency and bandwidth of the carrier signal as referenced by the table 700.

It should be appreciated that the determinations and center frequency thresholds shown in the table 700 are examples and other center frequency thresholds may be provided in other implementations. For example, in other implementations further divisions of center frequency thresholds may be provided for a more conservative approach for ensuring filtering is active in additional scenarios where more of a guard band is desired between the edge of a band and the closest part of a victim band. Often, the victim band may be a band adjacent to the carrier signal frequency band. The thresholds and decisions for when to use the bypass signal path or the filtered signal path may be determined when the transmit chain, antenna isolation, and filters for an electronic device have been fully characterized. The switched filter controller 132 is further configured to selectively cause the switching circuitry 202 to connect the transceiver unit 126-1 to the antenna 130 via the bypass signal path or via the filtered signal path based further on a proximity of the center frequency of the carrier signal within the frequency band to a different frequency band (e.g., the victim band).

In accordance with FIG. 7, as an example, if the center frequency of the carrier signal is between 2550 MHz and 2575 MHz and the bandwidth of the carrier signal is equal to or lower than 50 MHz, the switched filter controller 132 causes the switching circuitry 202 to connect the transceiver unit 126-1 to the antenna 130 via the bypass path. Other examples may be derived or extrapolated from the table 700 of FIG. 7. In a few cells in the table 700, a 'na' label is depicted to indicate that this combination is not applicable (e.g., not allowable based on the combination of bandwidth and center frequency that fit within the frequency range of the band). For example, for a center frequency equal to or less than 2510 MHz, a carrier signal bandwidth of 100 MHz or 80 MHz would result in the carrier signal frequency range impermissibly extending beyond the edge of the band n41 as defined (e.g., for 80 MHz the resulting frequency range would extend between 2470 and 2550 which would no longer be within the band n41 with a lower edge of 2496 MHz).

Power Level

In some implementations, the power level of the carrier signal may be used by the switched filter controller 132 to determine whether to use the bypass signal path or the filtered signal path. In these implementations, the switched filter controller 132 is configured to cause the switching circuitry 202 to selectively connect the transceiver unit 126-1 to the antenna 130 via the bypass signal path or via the filtered signal path based on a power level of the carrier signal (e.g., alone or in some combination with one or all of the frequency band, center frequency, and carrier signal bandwidth). For example, at certain lower power levels, even if the carrier signal has a wider bandwidth and/or the center frequency of the carrier signal is in the lower or upper portion of the frequency band (e.g., closer to the victim frequency band), the amount of interference with the victim band may be sufficiently lower at the lower power levels to make further filtering unwarranted. As a result, if the power level of the carrier signal is below a threshold, the switched filter controller 132 may be configured to select the bypass signal path. In other situations, if the power level of the carrier signal is below a threshold and the bandwidth of the carrier signal (and/or center frequency) is also below a threshold, the switched filter controller 132 may be configured to select the bypass signal path. For example, if the bandwidth of the carrier signal is below a threshold such as at or below 60 MHz, then for certain lower power levels, even if the center frequency is fairly close to the victim frequency band, the bypass signal path may be selected by the switched filter controller 132. Likewise, if the power level of the carrier signal is above a threshold, then for particular bandwidths and/or carrier frequency combinations, the switched filter controller 132 may be configured to select the filtered signal path. As such, certain combinations of power levels, bandwidths, and center frequencies may cause the switched filter controller 132 to select the bypass signal path while other combinations may cause the switched filter controller 132 to select the filtered signal path.

Victim Carrier Frequency

The switched filter controller 132 may determine whether to select the bypass signal path or the filtered signal path based additionally on the victim carrier frequency. Particularly, the switched filter controller 132 may be further configured to selectively cause the switching circuitry 202 to connect the transceiver unit 126-1 to the antenna 130 via the bypass signal path or via the filtered signal path based further on a frequency of a second signal (e.g., victim signal) within a second frequency band (e.g., victim frequency band) different from the frequency band (e.g., aggressor band) of the carrier signal (e.g., aggressor signal). The particular center frequency of the victim signal within the victim frequency band may additionally be used.

For example, if the victim wireless protocol (e.g., the wireless protocol potentially interfered with by the carrier signal (e.g., aggressor signal)) is operating in a portion of the victim frequency band which is farther away from the carrier signal band (e.g., the aggressor band referring to the signal causing the interference), then the bypass signal path may be selected. As a particular example, a Wi-Fi transceiver may be operating (e.g., receiving) on a channel that is in the lower end of the 2.4 GHz band (and may have a smaller bandwidth in certain situations). In this case, even if the carrier signal (e.g., aggressor signal) has a bandwidth/power level/etc. that is interfering with a portion of the 2.4 GHz band (e.g., victim band), if the operational portion of the 2.4 GHz band is not within the interfered portion of the 2.4 GHz band, the switched filter controller 132 may determine to use the bypass signal path. In this way, additional insertion loss caused by the filter 210 for the carrier signal may be avoided.

As such, the switched filter controller 132 may be configured to determine an operating victim center frequency of a victim frequency band (e.g., what current channel is being used where a center frequency is used to delineate one of many channels or smaller frequency ranges within a band) and determine whether or not to bypass the filter 210 based on the victim center frequency. If the difference between the center of the current operating victim frequency and the frequency range within the victim band where potential interference occurs is greater than a threshold, the switched filter controller 132 may determine to use the bypass signal path.

Figure 8:
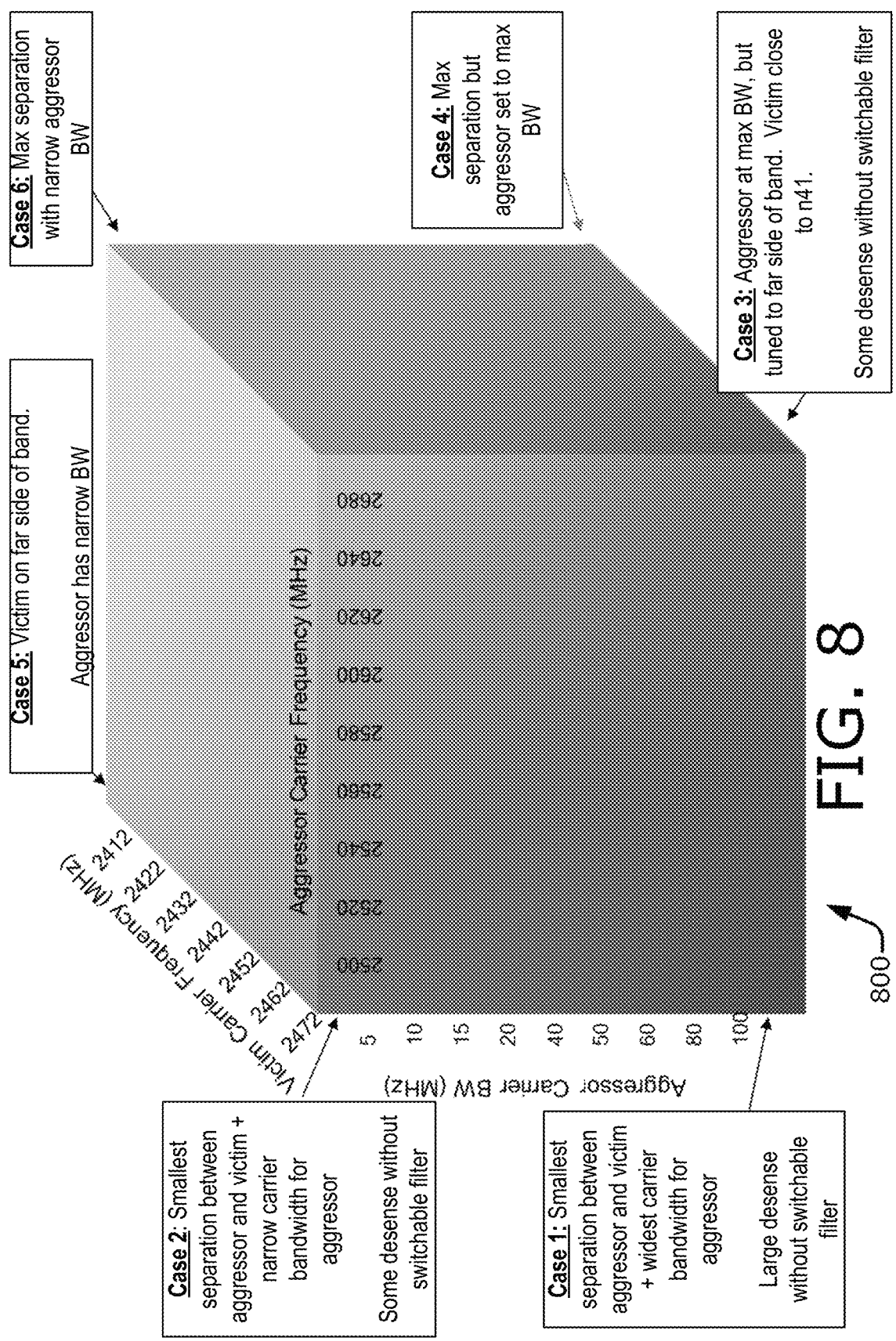
FIG. 8 is an illustration of a determination for whether to select a bypass signal path or a filtered signal path based on a carrier signal center frequency within a carrier signal frequency band, the carrier signal bandwidth, and a victim carrier frequency.

FIG. 8 is an illustration 800 of a determination for whether to select a bypass signal path or a filtered signal path based on a carrier signal center frequency within a carrier signal frequency band (e.g., aggressor frequency band), a carrier signal bandwidth, and a victim carrier frequency (e.g., victim center frequency). The example in FIG. 8 is based on the n41 5G NR band (e.g., aggressor) and the 2.4 GHz Wi-Fi band (victim) and illustrates various thresholds and combinations of parameters the switched filter controller 132 may use to determine whether to select the bypass signal path or the filtered signal path. The aggressor labeled in FIG. 8 may refer to the carrier signal for which the transceiver unit 126-1 is configured to transmit via the antenna 130.

As illustrated by case 1, the aggressor bandwidth is at an upper limit (e.g., 100 MHz) while the separation between the center frequency of the carrier signal and the operating victim carrier frequency are as close as allowed. In this case, there may be large potential desense of the victim wireless protocol (e.g., Wi-Fi 2.4 GHz) without additional filtering.

In this case, the switched filter controller 132 determines to select the filtered signal path (e.g., causes the switching circuitry to connect the transceiver unit 126-1 to the antenna 130 via the filtered signal path).

As illustrated by case 2, the spacing between the center frequency of the carrier signal (e.g., aggressor signal) and the center frequency of the victim carrier frequency are close together, but the bandwidth of the carrier signal is at a lower limit. Due to the proximity of the operating frequencies there may be some desense and the switched filter controller 132 may determine to continue to select the filtered signal path. However, if the victim carrier frequency changes at all to a lower frequency (e.g., channel—lower due to the fact that the Wi-Fi band is lower than n41 but could be higher frequency if the victim band is higher in frequency than the aggressor band), the switched filter controller 132 may determine to select the bypass signal path as the narrower carrier signal bandwidth may not cause interference with the majority of the victim band frequency range.

As illustrated by case 3, the carrier signal bandwidth (e.g., aggressor bandwidth) is at an upper limit but is centered at the far side of the frequency band while the center frequency of the victim carrier frequency is closer to the carrier signal band edge (e.g., aggressor band edge). Similar to case 2, there may be some desense in this case due to the large carrier signal bandwidth. As a result, the switched filter controller 132 may determine to select the filtered signal path. However, if the victim carrier frequency changes at all to a lower frequency, the switched filter controller 132 may determine to select the bypass signal path based on the difference in victim and aggressor center frequencies.

As illustrated by case 4, while the carrier signal bandwidth is at an upper limit, the difference between the center of victim and aggressor frequencies is also the largest. In this case, the amount of desense may be much less than in other cases and sufficiently low such that the switched filter controller 132 may determine to select the bypass signal path.

As illustrated by case 5, while the carrier signal center frequency is at the edge of the band (e.g., aggressor band) closer to the victim band, the bandwidth of the carrier signal (e.g., aggressor signal) is also at a lower limit while the center of the victim frequency is also at a far side of the victim band away from the edge of the carrier signal frequency band (e.g., aggressor band). In this case, based on the narrower bandwidth of the carrier signal (e.g., aggressor signal) and distance between center frequencies between the two signals there may be less desense and sufficient such that the switched filter controller 132 may determine to select the bypass signal path.

As illustrated by case 6, the carrier signal bandwidth (e.g., aggressor bandwidth) is at the lower limit while the distance between center frequencies of the aggressor and victim signals is also the largest where both are towards the edges of their bands distal to each other. In this case, there is minimal desense by the carrier signal (e.g., aggressor signal) and the switched filter controller 132 may determine to select the bypass signal path.

As such, the switched filter controller 132 may have various threshold ranges for each of the parameters of aggressor carrier bandwidth, aggressor carrier center frequency, victim carrier center frequency and determine to select the bypass signal path or the filtered signal path based on the threshold ranges. In some implementations, a look-up-table may be provided with a bypass or filter decision determination for each combination of the parameters (or combinations of ranges of parameters). Furthermore, as described above, the power level of the carrier signal (e.g., aggressor transmission power level) may be another parameter used in combination with the other parameters for use by the switched filter controller 132 to determine whether to select the bypass signal path or the filtered signal path. Additional control parameters may be employed as well.

In addition to the above parameters, if the switched filter controller 132 determines that the coexisting wireless protocol is not active (e.g., not currently operating), the switched filter controller 132 may be configured to select the bypass signal path. For example, if Wi-Fi is not operating, the switched filter controller 132 may select the bypass path for the n41 transceiver.

In general, when the transceiver unit 126-1 is operational, the switched filter controller 132 may periodically (e.g., every X seconds or in response to a change in one of the one or more control parameters 216) make updates to the determination as to whether to select the bypass filter path or the filtered signal path. In this way, as operational conditions change (e.g., victim channel, bandwidth, power level changes), the switched filter controller 132 may respond dynamically during operation to switch between the bypass signal path or the filtered signal path. In another aspect, any change in operating condition (e.g., victim channel, center carrier frequency, power level) may trigger the switched filter controller 132 to make a determination as to whether to switch between the bypass signal path or the filtered signal path.

Figure 9:
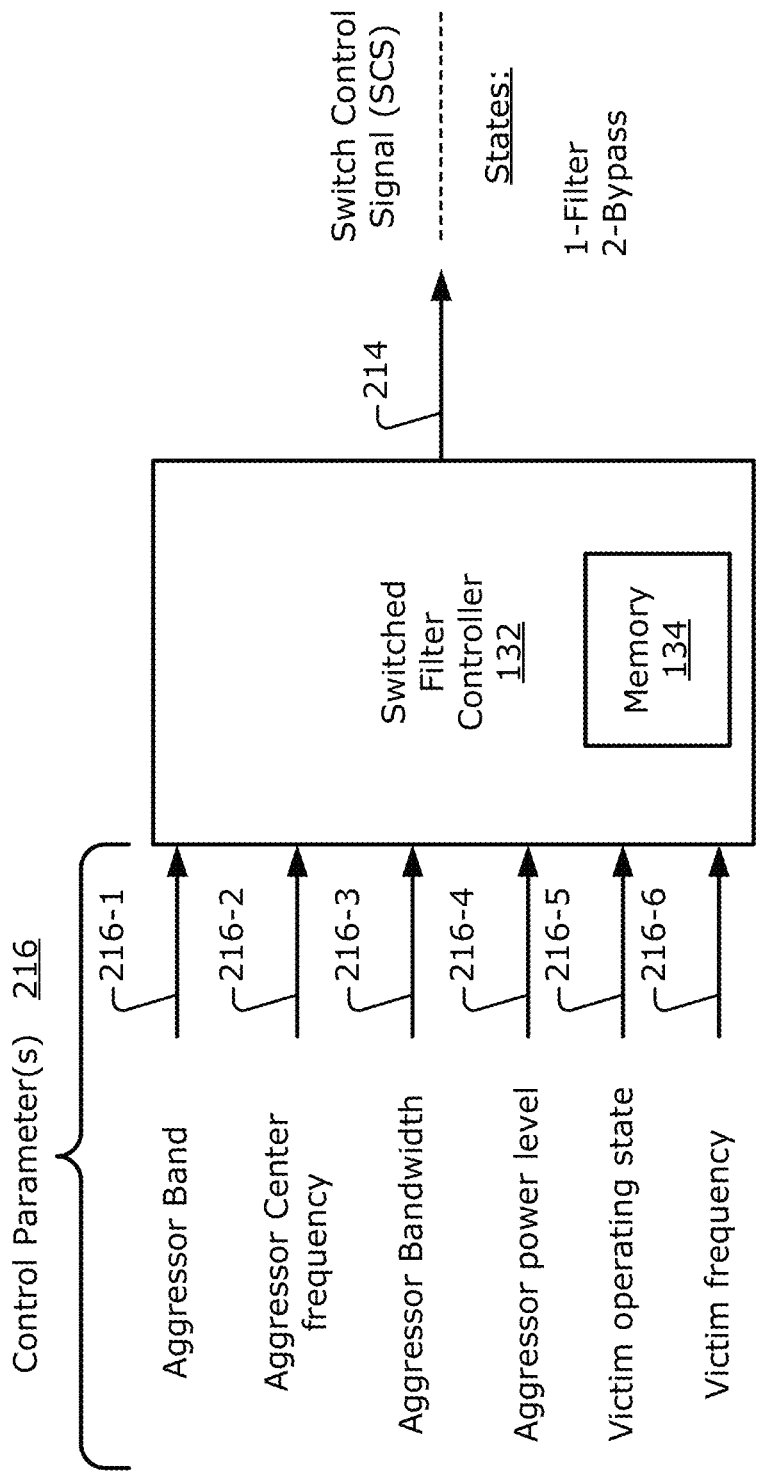
FIG. 9 illustrates another example implementation for a switched filter controller for enhanced coexistence management.

FIG. 9 illustrates generally at 900 another example implementation for a switched filter controller 132 for enhanced coexistence management. The implementation is the same as described with respect to FIG. 6 and includes further examples of the one or more control parameters 216 provided to the switched filter controller 132. In the example 900, the first control parameter 216-1 corresponds to an aggressor frequency band (e.g., n41 as one example for illustrative purposes). The second control parameter 216-2 corresponds to a center frequency of an aggressor signal within the aggressor frequency band (e.g., carrier band and carrier signal from FIG. 6). The third control parameter 216-3 corresponds to a bandwidth of the aggressor signal (e.g., 100 MHz, 40 MHz, 20 MHz, etc.). The fourth control parameter 216-4 corresponds to an aggressor signal power level. The fifth control parameter 216-5 corresponds to a victim operating state 216-5 (e.g., active, disabled, asleep, and the like) that may correspond to an operating state of a receiver transceiver that is potentially interfered with by the aggressor signal. The sixth control parameter 216-6 corresponds to a victim frequency 216-6 (e.g., center frequency of the particular channel in which the receiver is operating for a given victim bandwidth within the victim band). Other control parameters are also possible. It should be appreciated that while the center frequency is described herein as a frequency of the aggressor or victim signal, other reference frequencies other than the center frequency may be used in accordance with the principles herein and contemplated by implementations described herein (e.g., for example a signal may have a frequency range and the frequency of the signal used for determining interference may be either a center frequency, edge frequency, or other frequency within the frequency range of the signal).

Based on at least one of the one or more control parameters 216, the switched filter controller 132 produces the switch control signal 214. The switch control signal 214 is provided to a switched filter 128, such as the switched filter 128 of FIGS. 2-5. The switch control signal 214 is indicative of a state of the switched filter 128. Example states include, a filter state and a bypass state. The switch control signal 214 can be issued to the switching circuitry 202 (e.g., of FIG. 2A) of at least one switched filter 128.

As noted above, all or part of the switched filter controller 132 may be implemented by the modem 120-*m* as shown in FIG. 2A. The modem 120-*m* may have access to each of the one or more control parameters 216 (and particularly with respect to having access the victim transceiver parameters). As described above, the switched filter controller 132 may receive the one or more control parameters 216 and reference a LUT or other data structure to determine the filter or bypass state based on the combinations of the one or more control parameters 216. The switched filter controller 132 may additionally compare the one or more control parameters 216 to one or more thresholds to determine whether to select the filter signal path or the bypass signal path.

In another aspect, the switched filter controller 132 may use the one or more control parameters 216 to calculate a particular value that corresponds in general to a level of interference that the victim transceiver may experience. If the level of interference calculated is below a threshold, then the switched filter controller 132 may determine to select the bypass signal path. Likewise, if the level of interference calculated is above a threshold, then the switched filter controller 132 may determine to select the filtered signal path. For example, based on the one or more control parameters 216, a value indicative of an out of band efficiency of a victim receiver may be calculated (may be an estimated value) by the switched filter controller 132. If the switched filter controller 132 determines that the value is below a threshold, the switched filter controller 132 determines to select the bypass signal path. Other values indicative with the power spectral density or adjacent channel noise may be used. In another aspect, the switched filter controller 132 may calculate a signal-to-noise ratio (SNR) for the victim receiver when the aggressor transmitter (e.g., WWAN) and the victim receiver (e.g., WLAN) are operating. If the switched filter controller 132 determines the SNR is higher than a threshold then the switched filter controller 132 may determine to select the filtered signal path (and if otherwise select the bypass signal path). This may allow for keeping transmit powers high (e.g., using the filtered signal path to enable coexistence but maintain higher transmit power levels) while keeping an option open to avoid the additional insertion loss of the filter when coexistence is not an issue by using the bypass signal path.

In accordance with further implementations of the switched filter controller 132 of FIG. 9, the switched filter controller 132 (also may be referred to as a coexistence manager) is configured to calculate a level of desense (either estimated or measured) to the victim receiver and determine if the switched filter 128 uses the bypass signal path or the filtered signal path based on the calculated level of desense. For example, during the design of an electronic device 102 such as a smart phone, the transmitter 254 (e.g., transmit chain) and power amplifier 256 may be characterized and out of band emissions of the power amplifier 256 for a given power level, carrier signal frequency, and carrier signal bandwidth may be measured. In this implementation, this information is made available to the switched filter controller 132 (e.g., in the form of a look up table or using a mathematical expression such as a polynomial). From this information, the switched filter controller 132 determines a value indicative of a power spectral density or total channel power in the channel of the victim receiver (e.g., the victim receiver may be in another transceiver unit 126-*n* that is different from the transceiver unit 126-1 associated with the aggressor transmitter 254).

The switched filter controller 132 also receives or has information indicative of a total isolation between the aggressor transmitter 254 and the victim receiver. Isolation may be provided by either antenna separation if the two systems are operating on different antennas and/or be provided via filtering. As described above, filters may be BAW, SAW, FBAR, LTCC, lumped element, dielectric resonators or any other type of filters used in communication devices. As noted above, there may be multiple filters in various locations in the transmit or receive chain. For example, a power amplifier module including the power amplifier 256 may include a wideband filter internal to the power amplifier 256. As will be further described below, there may also be a diplexer, triplexer, quadplexer or more generally an n-plexer in the transmit or receive chain to allow systems which operate in different bands to be combined onto a single antenna 130. These dipelxers, triplers, quadraplexers or n-plexers will have some rejection which will be additive at a specific frequency to a filter which may be present within the power amplifier module. Discrete filters (e.g., filter 206 of FIG. 2) may also be used in the transmit chain and their rejection is also additive to the other filters. The rejection at each relevant frequency of each of the filters is received at or known by the switched filter controller 132 (e.g., may be provided during the development of the electronic device in the form of a LUT or mathematical formula such as a polynomial). From this further information, the switched filter controller 132 may determine a value indicative of the power spectral density of noise which is being generated by the aggressor transmitter in the victim receiver. The switched filter controller 132, as an example, may use the following calculation.

Power Spectral Density at the Victim Receiver=Power spectral density of out-of-band emissions from a power amplifier 256 for a given power and channel which coincides with the operating channel of the victim receiver minus antenna isolation if separate antennas are used between the aggressor and victim transceiver minus a total filter rejection (taking into account all filters chain) in an aggressor transmit chain at the channel of the victim receiver.

Based on the calculated power spectral density at the victim receiver value, this value may be compared to a threshold by the switched filter controller 132 and/or used to determine whether to use the bypass signal path or the filtered signal path (e.g., if above a threshold then the filtered signal path may be determined to be used or if below the threshold then the bypass signal path may be used).

As a further example (where specific values are provided for purposes of illustration only), a typical input referred noise figure of a receiver in an electronic device may be approximately on the order of −110 dBm/MHz, assuming a full chain noise figure of 4 dB. In general, a quality receiver with relatively low front end insertion loss may have a noise figure on the order of 3 dB, while a more typical receiver with a few dB of front end loss from the filters and multiplexers may be on the order of 5 to 6 dB. If a calculated power spectral density value at the victim receiver is determined by the switched filter controller 132 to be sufficiently below an input referred noise floor of the receiver, the switched filter controller 132 may be configured to cause the switched filter 128 to use the bypass signal path to optimize performance for the aggressor transceiver. However, if the switched filter controller 132 determines that significant amounts of desense are being imparted onto the victim receiver, based on the calculated power spectral density, and the victim receiver is actively being used, the switched filter controller 132 may be configured to determine to use the filtered signal path using a high selectivity filter 210 to further protect and reduce desense to the victim receiver.

By way of example for purposes of illustration, for a receiver with an input referred noise floor of −110 dBm/MHz, if the victim transmitter were to generate a noise contribution at the input to the victim receiver which is also at 110 dBm/MHz, approximately 3 dB of desense would be imparted to the victim receiver. This may be a significant amount of desense but may be acceptable if an SNR of the signal being received by the victim receiver is sufficiently higher than a 3 dB degradation and does not significantly reduce the throughput. However, if the victim receiver is operating on the edge of the cell near its sensitivity level, an additional 3 dB of desense may result in a link being dropped and the switched filter controller 132 may need to switch in the additional filter 210 (e.g., use the filtered signal path) to protect the victim receiver. For an integrated coexistence switched filter controller 132 which has information about both the aggressor and victim systems, the determination as to whether protection of the victim receiver is needed can be made intelligently by the switched filter controller 132 and in such a way as to increase the throughput and improve overall user experience.

Figure 10:
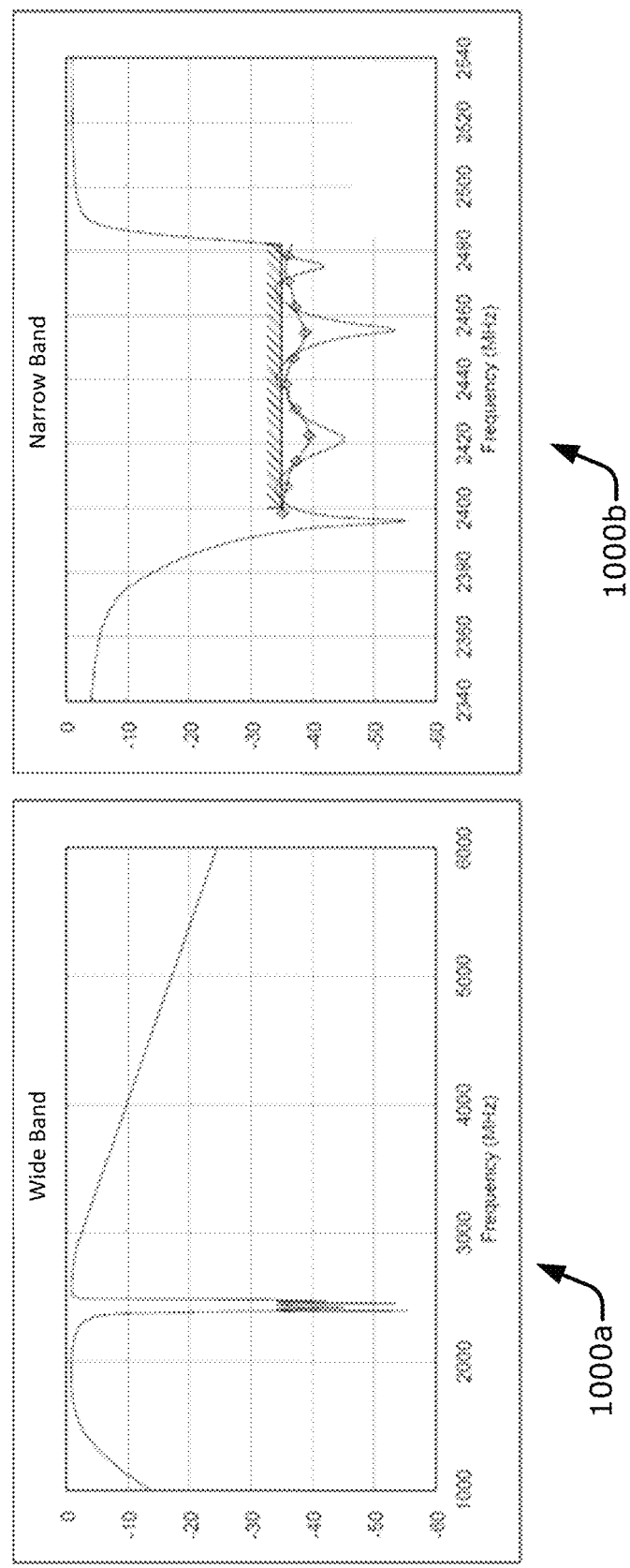
FIG. 10 illustrates an example frequency response of a filter having a rejection band within the 2.4 GHz band that may be used in the switched filter.

In another example for purposes of illustration, if the switched filter controller 132 determines that the power spectral density at the victim receiver (without the additional filter 210 switched in) is on the order of −80 dbm/MHz, the switched filter controller 132 may determine that the resultant desense is on the order of 30 dB. 30 dB of desense may be significant and may eliminate any possibility of establishing a communication link using the victim receiver for many realistic use cases. In this case, the switched filter controller 132 may determine to use the filtered signal path and switch in the additional filter 210. Assuming the filter provides on an order of 33 dB of additional rejection as shown in the example of FIG. 10 described below, the power spectral density of the noise at the victim receiver after the filter 210 has been switched may be on the order of −80 dBm/MHz−33 dB=−113 dBm/MHz. At this point the noise contribution from the aggressor may be below the input referred noise floor of the receiver of −110 dBm/MHz (in the absence of interference). The desense to the victim receiver may now be relatively small, and on the order of 1.8 dB. This level of desense would be acceptable in most cases and allow the victim receiver to operate within 1.8 dB of its nominal sensitivity level.

In yet another example for purposes of illustration, the switched filter controller 132 may determine that the power spectral density of noise being generated by the aggressor transmitter in the victim receiver channel, without the additional filter 210, is on the order of −116 dBm/MHz. In this scenario, the noise contribution of the aggressor is 6 dB below the input referred noise floor of the victim receiver and only 1 dB of desense would result to the victim receiver. In this scenario, given that the additional insertion loss of the filter 210 may result in 1-2 dB of desense to the aggressor system, it may not be beneficial to toggle in the additional filter 210, and the switched filter controller 132 may determine to use the bypass signal path to maximize the net throughput and overall user experience. In all of these scenarios, the switched filter controller 132 is configured to calculate a level of the noise being generated by the aggressor transmitter (and calculate other values as described above) in the victim receiver based on the aggressor carrier frequency, aggressor power level, total rejection of the filters in the transmit chain at the frequency of the victim receiver channel, and also antenna isolation if separate antennas are being used. From this information, the switched filter controller 132 may be configured to calculate the desense to the victim receiver. In this implementation, the switched filter controller 132 has information about an operating state of the victim receiver, including the signal-to-noise ratio (SNR) of the signal being received, and may be able to determine the benefit of switching in the additional filter 210 or using the bypass signal path. For example, in a scenario where the victim receiver is very close to the cell site or access point and has an SNR of 45 dB, it may not be beneficial for the switched filter controller 132 to toggle in the additional filter 210 even if the aggressor transmitter is imparting a desense of several dB given that only 35 dB of SNR are required to receive modulation type MCS 11 (for example 1024 QAM modulation, for an 802.11ax system). Conversely, in a scenario where the victim receiver is operating near sensitivity, with an SNR of 3-4 dB, the switched filter controller 132 may determine to toggle in the additional filter 210 even if a relatively small dense of 2-3 dB is being imparted onto the victim receiver.

In another aspect, the switched filter controller 132 may employ a closed loop mechanism to determine the benefit of using either the bypass signal path or filter signal path. For example, where the switched filter controller 132 has knowledge of both the victim and aggressor system properties (e.g., the one or more control parameters 216 described above), the switched filter controller 132 may be configured to determine the level of desense imparted to the victim receiver when the aggressor transmits, using a feedback mechanism. The SNR of the receiver can be reported by the victim system when the aggressor is in either transmit or receive mode. From this information, the switched filter controller 132 may be configured to determine the level of desense being imparted onto the victim receiver by the aggressing transmitter. If the level of desense is suitably small (e.g., lower than a threshold), the switched filter controller 132 may determine to use the bypass signal path. Alternatively, if the desense is significant (e.g., higher than a threshold), the switched filter controller 132 may determine to use the filtered signal path to switch in the additional filter 210. In certain aspects, the switched filter controller 132 may also have knowledge of the modulation type which is being received by the victim receiver and the required SNR to successfully receive this level of modulation. If the level of calculated desense does not prevent the victim receiver from receiving the modulation currently being used on the link, the switched filter controller 132 may determine to use the bypass signal path even if some desense is being reported to the switched filter controller 132.

Coexistence Pins

In some implementations there may be communication signals transmitted either between different transceiver units or between different modem segments to alert each other about communication events. For example, there may be high speed GPIO pins between a WWAN transceiver unit 126-1 and WLAN transceiver unit 126-n that may be referred to as coexistence pins. When one transceiver unit 126-n is becoming operational (e.g., about to transmit or about to receive in order to establish a channel or for other purposes), the coexistence pin may be used to send a signal alerting the other transceiver unit 126-n. The switched filter controller 132 may receive signals on the coexistence pins to determine whether to switch between the bypass signal path or the filtered signal path based on the signals. In this case, the switched filter controller 132 is configured to selectively connect the transceiver unit 126-1 to the antenna 130 via the bypass signal path or via the filtered signal path based further on a signal from a second transceiver unit 126-n indicating a transmission or reception associated with a rejection band of the filter 210. For example, based on a signal from the coexistence pin from the WLAN transceiver unit 126-n, the switched filter controller 132 may determine to switch to the filtered signal path in order to ensure the WLAN transceiver unit 126-1 is free of interference when transmitting or receiving a preliminary communication for establishing a channel. The coexistence pin may be faster than messaging between modems which may have some latency.

As such, in general, the wireless communications apparatus may include a second transceiver unit 126-n and the switched filter controller 132 is configured to cause the switching circuitry 202 to selectively connect the transceiver unit 126-1 to the antenna 130 via the bypass signal path or via the filtered signal path based further on information from the second transceiver unit 126-n. The information from the second transceiver unit 126-1, among other parameters may include information indicative of an operational frequency band of a second signal different than the carrier signal, or a location of a center frequency of the second signal within the operational frequency band, or a power level of the second signal, or some combination thereof.

Example Filter Frequency Response

As mentioned above, the filter 210 may be a notch filter having a frequency rejection band that is adjacent to the frequency band of the carrier or a frequency rejection band that is in a frequency band in which the carrier signal is causing interference. As an example, for a transceiver unit 126-1 configured to transmit using the n41 band, the filter 210 of the switched filter may have a rejection band that covers a range in the Wi-Fi 2.4 GHz band. FIG. 10 illustrates an example frequency response 1000a and 1000b of a filter 210 having a rejection band within the 2.4 GHz band that may be used in the switched filter 128. This example is for purposes of illustration of the various ranges may be used. However other filter response may be provided for other filters to address coexistence between different bands other than n41 and the Wi-Fi 2.4 GHz band.

In this example, the carrier signal is associated with a WWAN protocol and the filter 210 is configured to have a rejection band within a frequency band of a WLAN protocol. The carrier frequency band may be n41 and the filter is configured to have a rejection band within a 2.4 GHz Wi-Fi band. In another implementation, the carrier signal frequency band is n79 and the filter is configured to have a rejection band within a 5 GHz Wi-Fi band. In general, in certain implementations, the frequency band of the carrier signal associated with the transceiver unit 126-1 comprises a band assignment that comports with a Long-Term Evolution (LTE) standard or 5G new radio standard.

Multiple Switched Filters

Figure 11:
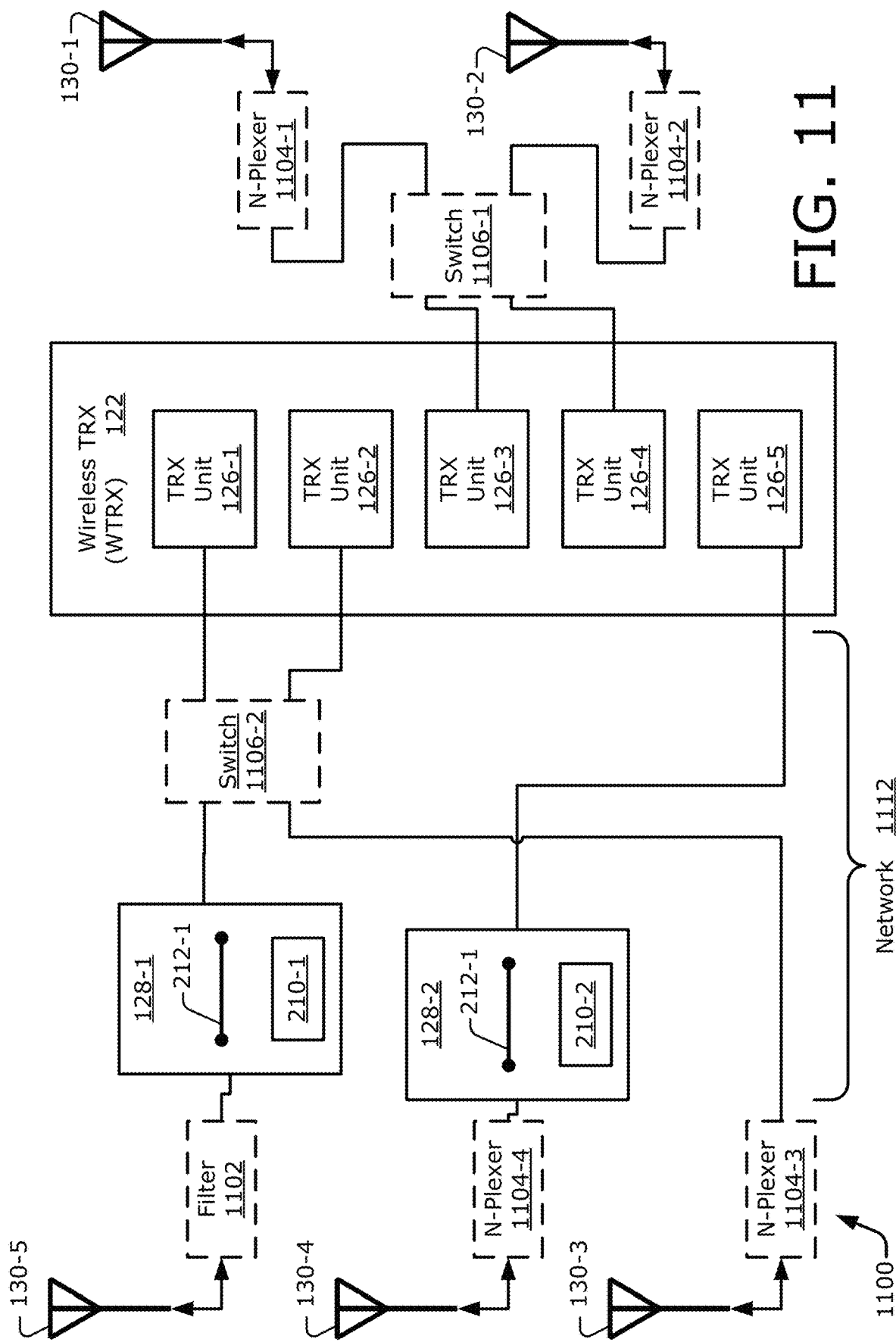
FIG. 11 illustrates a portion of an electronic device having multiple antennas operating with multiple wireless protocols and including a first and second switched filter.

An electronic device may have more than one switched filter 128. FIG. 11 illustrates a portion of an electronic device 1100 having multiple antennas operating with multiple wireless protocols. As shown in FIG. 11, the electronic device 1100 includes multiple antennas 130, at least one filter 1102, at least one N-plexer 1104, at least one switch 1106, and at least one wireless transceiver 122, in addition to a first switched filter 128-1 and a second switched filter 128-2. Optional elements are shown with dashed lines. These components are interconnected using multiple electrically-conductive lines (e.g., wires or traces). As illustrated, the electronic device includes five antennas 130-1, 130-2, 130-3, 130-4, and 130-5. However, an electronic device 1100 may have more or fewer antennas. Each respective antenna 130 is optionally coupled to a respective filter 1102 or N-plexer 1104. Thus, five total filters or N-plexers are coupled to the five antennas 130-1 . . . 130-5. N-plexers can include diplexers, triplexers, and so forth. An N-plexer can enable multiband antenna sharing with other modules that operate in different bands (e.g., 800 MHz, mid band (such as 1700-2200 MHz), and 5 GHz). To do so, each N-plexer includes two or more filter units configured to attenuate frequencies that are to be blocked from further propagation. Thus, a triplexer may include a high pass filter unit (e.g., for 5150-5925 MHz), a bandpass filter unit (e.g., for 3400-3800 MHz), and a lowpass filter unit (e.g., for 1400-2680 MHz). Although not shown, a respective conductive line extend from each respective filter unit to another respective component, such as a switch 1106 or transceiver unit 126.

Starting from the top right corner and moving clockwise, a first antenna 130-1 is coupled to a first N-plexer 1104-1, and a second antenna 130-2 is coupled to a second N-plexer 1104-2. A third antenna 130-3 is coupled to a third N-plexer 1104-3, and a fourth antenna 130-4 is coupled to a fourth N-plexer 1104-4. And a fifth antenna 130-5 is optionally coupled to a filter 1102. However, an electronic device may include fewer N-plexers or different number of filters or N-plexers, such as if an antenna 130 is associated with multiple filters or N-plexers. Here, each N-plexer 1104 can be implemented using one or multiple filter units and corresponding filter paths extending from each filter unit. Each of the filter units can include, for example, a low pass filter, a high pass filter, or a bandpass filter.

The wireless transceiver 122 includes multiple transceiver units. Specifically, five transceiver units 126-1, 126-2, 126-3, 126-4, and 126-5 are shown. Each respective filter 1102 or N-plexer 1104 is coupled to at least one respective transceiver unit 126-1 to 126-5. Although five transceiver units 126-1 to 126-5 are shown, the wireless transceiver 122 can include a different number of transceiver units, such as if an antenna 130 and corresponding filter or N-plexer are coupled to more than one transceiver unit 126.

Thus, a network of conductive lines, additional filters or N-plexers, buffers, splitters, switches, and so forth can extend between the filter and N-plexers that are depicted and the multiple transceiver units 126-1 to 126-5 as indicated by network 1112. Although the network 1112 is only explicitly indicated "on the left" of the wireless transceiver 122, the network 1112 may also include such components "on the right" of the wireless transceiver 122. Further, for clarity, additional details of this network 1112 are omitted from FIG. 11. However, two switches are explicitly illustrated. A switch 1106-1 is coupled between (i) the first N-plexer 1104-1 and the second N-plexer 1104-2 on one side and (ii) the third transceiver unit 126-3 and the fourth transceiver unit 126-4 on the other side. Also, a switch 1106-2 is coupled between (i) the first switched filter 128 and the third N-plexer 1104-3 on one side and (ii) the first transceiver unit 126-1 and the second transceiver unit 126-2 on the other side.

Different antennas can be useful for signal diversity, various signal frequencies, different communication technologies, implementing multiple-input multiple output (MIMO) processing for multiple streams, carrier aggregation (CA), beamforming from a particular side of an electronic device, and so forth.

As illustrated, the electronic device 1100 includes a first switched filter 128-1 and a second switched filter 128-2. The first switched filter 128-1 is coupled between a first transceiver unit 126-1 and the fifth antenna 130-5. The second switched filter 128-2 is coupled between a fifth transceiver unit 126-5 and the fourth antenna 130-4. The different transceiver units 126-1 and 126-5 may be configured for different frequency bands (and/or different wireless protocols). Each switched filter 128-1 and 128-1 may operate similar to that described above with reference to FIGS. 2-9 but each be configured with a filter 210 having a different frequency response (e.g., notch filters with different rejection bands). Each frequency response may be provided to selectively prevent interference with another band outside the band the respective transceiver unit 126 is operating.

As one example, the first transceiver unit 126-1 may be configured to transmit via a WWAN band (e.g., n41) and the filter 210-1 in the first switched filter 128-1 may be configured with a rejection band covering a WLAN band (e.g., Wi-Fi 2.4 GHz). In this example, the fifth transceiver unit 126-5 may be configured to transmit in another WWAN band (e.g., n79) and the filter 210-2 in the second switched filter 128-2 may be configured with a rejection band covering another WLAN band (e.g., Wi-Fi 5 GHz). Alternatively, the fifth transceiver unit 126-5 may be configured to transmit in a WLAN band (e.g., Wi-Fi 2.4 GHz) while the filter 210-2 in the second switched filter 128-2 may be configured with a rejection band covering a portion of a WWAN band (e.g., n41). Other switched filters (not shown) may be provided as well for different coexistence scenarios.

In another example, a first transceiver unit 126-1 configured for the n79 band may have switched filter 128-1 with a filter 210-1 with a rejection band within a Wi-Fi band at 5 GHz. Likewise, a fifth transceiver unit 126-5 configured for 5 GHz Wi-Fi may have a switched filter 128-2 with a filter 210-2 that has a rejection band within n79 to avoid desensing receiving in the n79 band. A 2.4 GHz second harmonic may also desense receiving in the n79 band, so likewise a fifth transceiver unit 126-5 configured for 2 GHz Wi-Fi may have a switched filter 128-2 with a filter 210-2 that has a rejection band within the n79 band.

Other Filtering Scenarios for Receiving

With reference to FIGS. 2A and 2B and FIG. 11, in several scenarios above, the carrier signal is a transmitted signal via the transceiver unit 126-1 and the filter 210 protects an adjacent or other band different from the frequency band within which the carrier signal is operating. However, in other scenarios, the reverse may be true and the filter 210 may be provided to improve the ability to extract a receive signal received via the transceiver unit 126-1. For example, an n41 receive signal may be saturated when in the adjacent 2.4 GHz band, Wi-Fi is transmitting and operating towards the upper end of the 2.4 GHz band. The switched filter controller 132 may detect this scenario and cause the switching circuitry 202 to connect the antenna 130 to the transceiver unit 126-1 using the filtered signal path via the filter 210. This may increase the ability to receive the signal in the n41 band. As n41 may be operated in a time division duplexed (TDD) fashion, the switching circuitry 202 may be configured to toggle the one or more switches synchronously with the TDD cycle (e.g., if for n41 transmission the switched filter is determined to use the bypass signal path but for n41 reception the switched filter is determined to use the filtered signal path then the switching circuitry 202 may toggle the one or more switches synchronously with the TDD cycle between the bypass line 212 and the filter 210). Regardless, the switched filter 128 may be provided for different frequency bands in different scenarios for filtering for either a signal transmitted or received via the transceiver unit 126-1 connected to the switched filter or a signal passing through another transceiver unit 126-2.

Extractor

Figure 12:
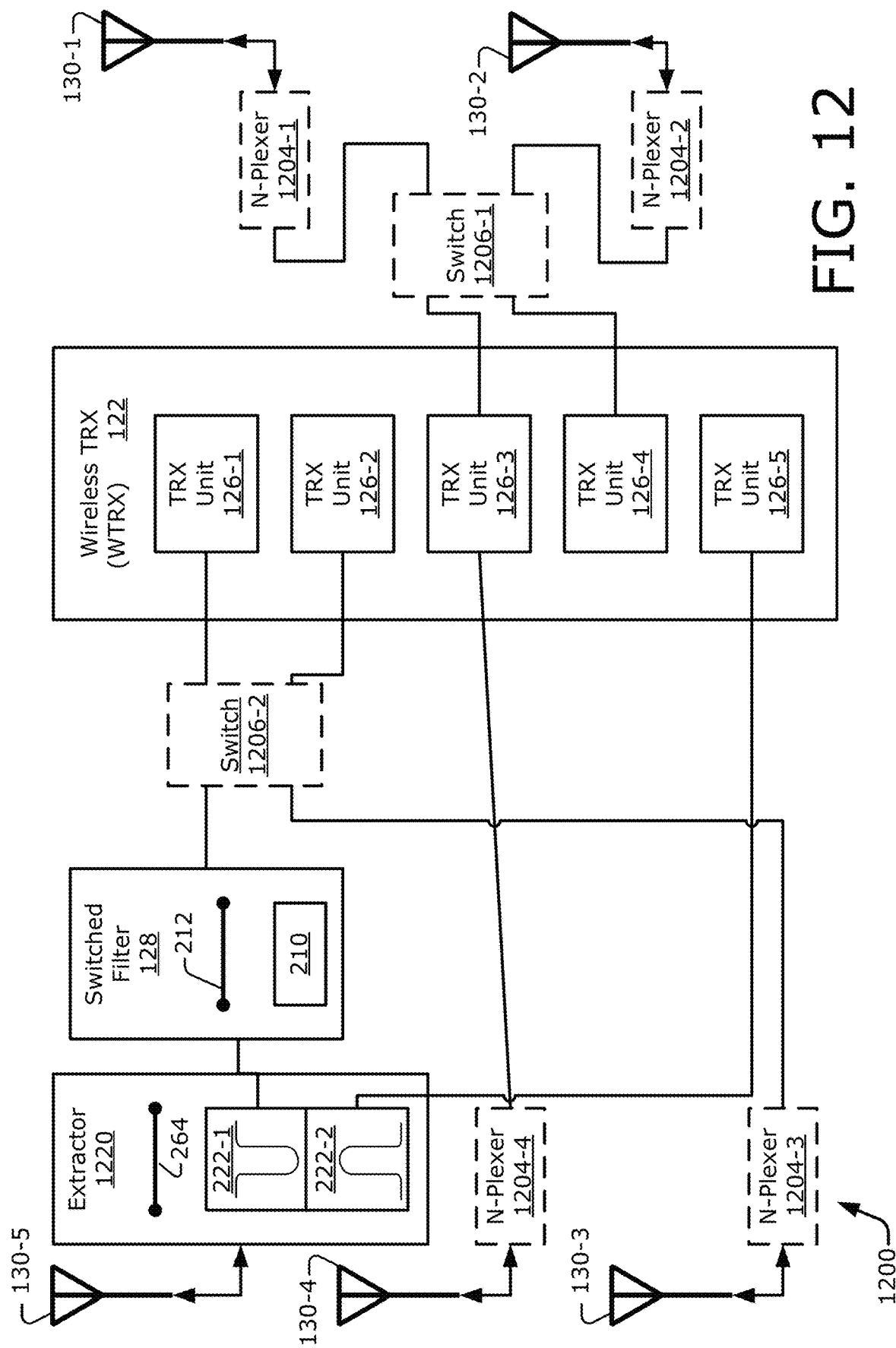
FIG. 12 illustrates a portion of an electronic device having multiple antennas operating with multiple wireless protocols and including a switched filter along with an extractor.

In some scenarios it may be valuable to use a shared antenna for multiple wireless protocols e.g., such as WWAN and WLAN. An extractor circuit may be used in such a scenario. FIG. 12 illustrates a portion of an electronic device 1200 having multiple antennas operating with multiple wireless protocols and including a switched filter along with an extractor circuit. The components of FIG. 12 generally are the same as the components as described with FIG. 11 except the second switched filter 128-2 is absent and an extractor 1220 is added. The extractor 1220 may include at least a first filter 222-1 and a second filter 222-2. The first filter 222-1 may have a band rejection frequency response as illustrated by its frequency response while the second filter 222-2 may be a bandpass filter as illustrated by its respective frequency response. In an aspect, the rejection band of the first filter 222-1 may overlap with the pass band of the second filter 222-2. The extractor 1220 may be coupled between the fifth antenna 130-5 and multiple transceivers 126-1 and 126-5. For example, the extractor 1220 may be coupled between the fifth antenna 130-5 and the first transceiver unit 126-1 via the first filter 222-1. The extractor 1220 is further coupled between the fifth antenna 130-5 and the fifth transceiver unit 126-5 via the second filter 222-1. In one example, the first transceiver unit 126-1 is configured for a WWAN signal while the fifth transceiver unit 126-5 is configured for WLAN signals (e.g., Wi-Fi, Bluetooth, etc.). Alternatively, the fifth transceiver unit 126-5 may be configured for GPS signals. As an example, when the fifth transceiver unit 126-5 is configured for Wi-Fi, the rejection band of the first filter 222-1 and the pass band of the second filter 222-2 may be within the Wi-Fi frequency band (e.g., 2.4 GHz). In this way the WLAN content is extracted from the signal to allow a WWAN signal to be passed through to the first transceiver unit 126-1 without including the WLAN content. And likewise, the WLAN signal is passed through to the fifth transceiver unit 126-4 without including the WWAN signal content. In some aspects, a bypass line 264 can be provided within the extractor 1220 to bypass the first and the second filters 222-1 and 222-2 when WLAN is not active or under other conditions.

In combination with the extractor 1220, the electronic device 1200 further includes a switched filter 128 coupled between the extractor 1220 and the transceiver unit 126-1. The switched filter 128 may operate and be configured as described above with reference to FIGS. 2A-10. The switched filter 128 may in some implementations have a filter 210 with a similar rejection band as the filter 222-1. However, the sensitivity and performance of the filter 210 within the switched filter 128 may be significantly higher than that for the filter 222-1 (and generally with a higher insertion loss). Particularly, the filter 222-1 may not have sufficient performance to support full coexistence (e.g., as its purpose may be slightly different to enable antenna sharing and may have different characteristics). However, in other scenarios, the switched filter 128 may have different rejection bands or may be a bandpass filter for other bands as compared to the filter frequency bands of the filters 222-1 and 222-2.

Example Operations

Figure 13:
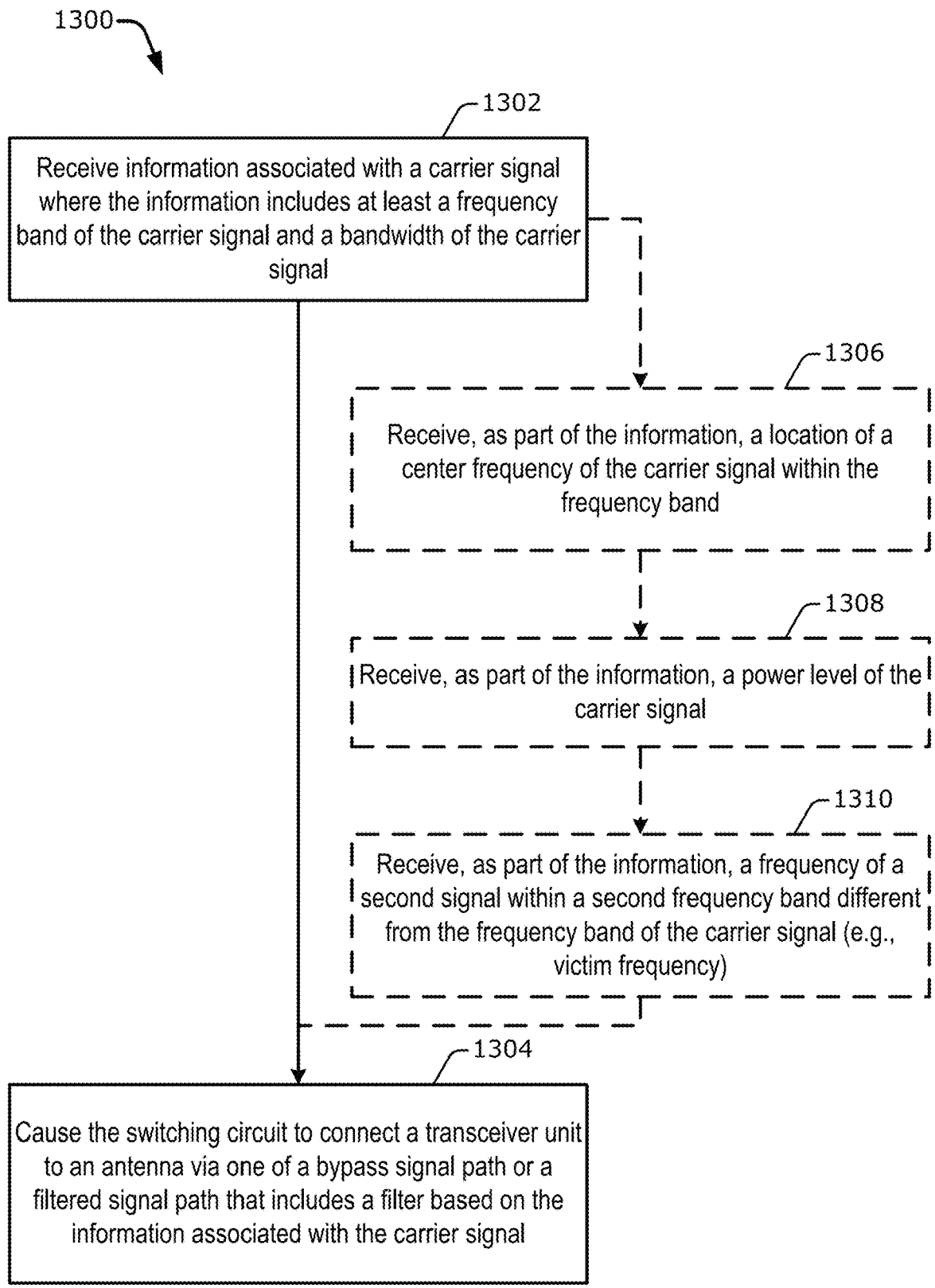
FIG. 13 is a flow chart illustrating an example of a method for implementing enhanced coexistence management using the switched filter controller of FIG. 6 and with reference to FIGS. 2A and 2B.

FIG. 13 is a flow chart illustrating an example of a method 1300 for wireless communications and implementing enhanced coexistence management using the switched filter controller 132 of FIG. 6 and with reference to FIGS. 2A and 2B. The method 1300 is described in the form of a set of blocks that specify operations that can be performed. However, operations are not necessarily limited to the order shown in FIG. 13 or described herein, for the operations may be implemented in alternative orders or in fully or partially overlapping manners. Also, more, fewer, and/or different operations may be implemented to perform the method 1300, or an alternative approach. As an example, the switched filter controller 132 may be used to carry out the operations in each of the blocks. At block 1302, information associated with a carrier signal is received (e.g., at the switched filter controller 132) where the information includes at least a frequency band of the carrier signal and a bandwidth of the carrier signal. At block 1304, the switched filter controller 132 causes the switching circuitry 202 to connect a transceiver unit 126-1 to an antenna 130 via one of a bypass signal path or a filtered signal path that includes a filter 210 based on the information associated with the carrier signal.

The method may further include routing a signal through the bypass signal path when the transceiver unit 126-1 is connected to the antenna 130 via the bypass signal path or routing the signal through the filtered signal path when the transceiver unit 126-1 is connected to the antenna 130 via the filtered signal path. In an aspect, the switching circuitry 202 may route the signals.

As illustrated by optional block 1306, the information received may further include a location of a center frequency of the carrier signal within the frequency band. In this case the method 1300 may include determining whether to cause the switching circuitry 202 to connect the transceiver unit 126-1 to the antenna 130 via the bypass signal path or the filtered signal path further based on the location of the center frequency of the carrier signal. In some aspects, the information may further include a proximity of the center frequency of the carrier signal within the frequency band to a different frequency band.

As illustrated by optional block 1308, the information received may further include a power level of the carrier signal. In this case the method 1300 may include determining whether to cause the switching circuitry 202 to connect the transceiver unit 126-1 to the antenna 130 via the bypass signal path or the filtered signal path further based on the power level of the carrier signal.

As illustrated by optional block 1310, the information received at the switched filter controller 132 may further include a frequency of a second signal within a second frequency band different from the frequency band of the carrier signal (e.g., victim frequency). In some aspects, this may correspond to a center frequency of the second signal. In this case the method 1300 may include determining whether to cause the switching circuitry 202 to connect the transceiver unit 126-1 to the antenna 130 via the bypass signal path or the filtered signal path further based on the frequency of the second signal.

One or more thresholds may be used in the method 1300 for determining whether to cause the switching circuitry 202 to connect the transceiver unit 126-1 to the antenna 130 via the bypass signal path or the filtered signal path further based on the frequency of the second signal. For example, as part of block 1304, the method may include selectively causing the switching circuitry 202 to connect the transceiver unit 126-1 to the antenna 130 via the bypass signal path or the filtered signal path based on determining whether the carrier signal bandwidth is above or below a threshold. Particularly, the method 1300 may include as part of block 1304 determining whether for a particular frequency band (e.g., one that may cause interference with another band) the operating carrier signal bandwidth is above or below a threshold. In response to determining the carrier signal bandwidth is above a threshold, the method 1300 may include causing the switching circuitry 202 to connect the transceiver unit 126-1 to the antenna 130 via the filtered signal path. Alternatively, in response to determining the carrier signal bandwidth is below the threshold, the method 1300 may include causing the switching circuitry 202 to connect the transceiver unit 126-1 to the antenna 130 via the bypass signal path.

If the location of the center frequency of the carrier signal within the frequency band is part of the information used, then the method 1300 may include as part of block 1304 determining whether the center frequency of the carrier signal is above or below a threshold (either alone or in combination with determining whether the carrier signal bandwidth is below or above a threshold). In response to determining the center frequency of the carrier signal is above a threshold (e.g., in this case the threshold may indicate a distance (e.g., absolute value) between the center frequency of the carrier signal (aggressor signal) and the victim band), the method 1300 may include causing the switching circuitry 202 to connect the transceiver unit 126-1 to the antenna 130 via the bypass signal path. Alternatively, in response to determining the center frequency of the carrier signal is below a threshold, the method 1300 may include causing the switching circuitry 202 to connect the transceiver unit 126-1 to the antenna 130 via the filtered signal path. Whether the center frequency is above or below a threshold may be based on the location of the victim band relative to the carrier signal frequency band (e.g., aggressor band). But in some aspects, if the threshold indicates a distance between the center frequency of the carrier signal (e.g., aggressor signal) and the victim band then if the distance is sufficient (e.g., above a certain threshold), then the method 1300 may select the bypass signal path.

If the power level of the carrier signal within the frequency band is part of the information used, then the method 1300 may include as part of block 1304 determining whether the power level is above or below a threshold (either alone or in combination with determining thresholds for the carrier signal bandwidth and the center frequency). In response to determining the power level of the carrier signal is above a threshold, the method 1300 may include causing the switching circuitry 202 to connect the transceiver unit 126-1 to the antenna 130 via the filtered signal path. Alternatively, in response to determining the power level of the carrier signal is below a threshold, the method 1300 may include causing the switching circuitry 202 to connect the transceiver unit 126-1 to the antenna 130 via the bypass signal path.

If the location of the operating center frequency of the victim frequency band is part of the information used, then the method 1300 may include as part of block 1304 determining whether the operating center frequency of the victim frequency band is above or below a threshold (either alone or in combination with the other parameters described above). In response to determining the operating center frequency of the victim frequency band is above a threshold (e.g., the threshold may indicate a distance between the operating center frequency of the victim frequency band and the aggressor carrier signal frequency band), the method 1300 may include causing the switching circuitry 202 to connect the transceiver unit 126-1 to the antenna 130 via the bypass signal path. Alternatively, in response to determining the operating center frequency of the victim frequency band is below a threshold, the method 1300 may include causing the switching circuitry 202 to connect the transceiver unit 126-1 to the antenna 130 via the filtered signal path. Whether the operating center frequency of the victim frequency band is above or below a threshold may be based on the location of the victim band relative to the carrier signal frequency band (e.g., aggressor band). But in some aspects, if the threshold indicates a distance between the operating center frequency of the victim frequency band and the aggressor band then if the distance is sufficient (e.g., above a certain threshold), then the method 1300 may select the bypass signal path.

In certain aspects, the method 1300 may include as part of block 1304 looking up information in the form of one or more control parameters 216 in a look-up-table (LUT). The look-up-table may store a decision state, either bypass signal path or filtered signal path, for various combinations of the one or more control parameters 216 including frequency band, carrier signal bandwidth, center frequency location, power level, victim center frequency, victim power level, and the like as illustrated by the example 800 of FIG. 8. Ranges may be used to reference the LUT.

In certain other aspects, the method 1300 may include as part of block 1304 (and as described similarly above with reference to FIG. 9) generating (e.g., calculating) a value indicative of a level of interference based on the information received (e.g., the one or more control parameters 216 of FIG. 9). In an aspect, the value may be an estimate of a level of interference of a victim transceiver (e.g., receiver in many implementations) based on the information received as described by the various blocks of the method 1300. In this case, the method 1300 may further include comparing the value generated to a threshold. The method 1300 may then include causing the switching circuit to connect the transceiver unit 126-1 to an antenna 130 via one of the bypass signal path or the filtered signal path based on whether the value is above or below a threshold (e.g., may determine to use the filtered signal path if the value is above the threshold or the bypass signal path if the value is below the threshold). A value may correspond to a value indicative of an out of band efficiency of a victim receiver, power spectral density, SNR, or other similar values that correspond to estimated or measured levels of interference the victim transceiver may experience.

Figure 14:
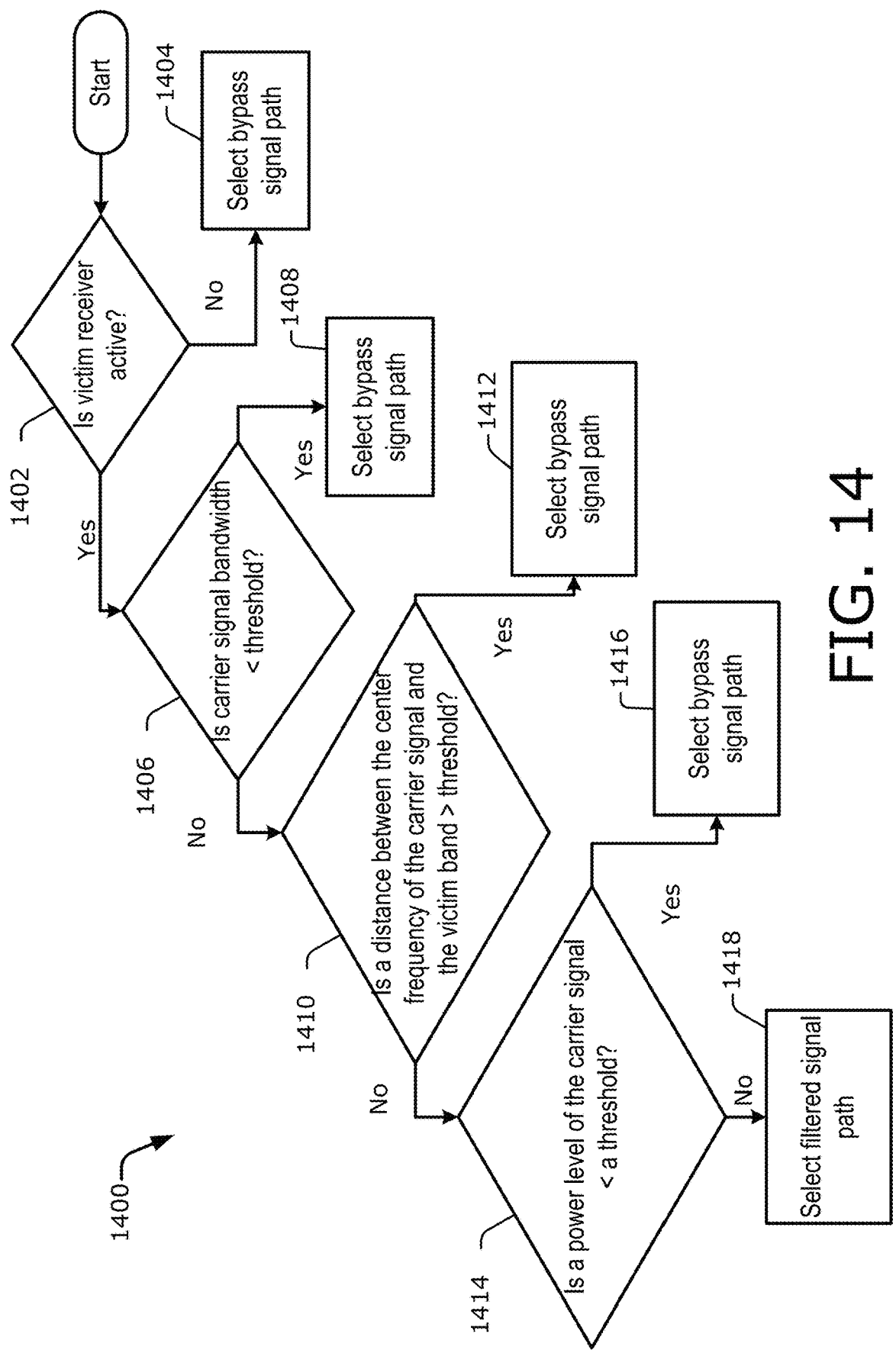
FIG. 14 is a flow chart illustrating another example of a method for implementing enhanced coexistence management using the switched filter controller of FIG. 6 and with reference to FIGS. 2A and 2B.

FIG. 14 is a flow chart illustrating another example of a method 1400 for implementing enhanced coexistence management using the switched filter controller 132 of FIG. 6 and with reference to FIGS. 2A and 2B. The operations described by the method 1400 may be performed by the switched filter controller 132. The method 1400 may represent examples of operations that may be a part of operations within block 1304 of FIG. 13. At decision block 1402, the method 1400 includes determining whether the victim receiver is active. If the victim receiver is not active (e.g., is disabled, sleeping, or the like) then the method 1400 includes selecting the bypass signal path as indicated by block 1404. For example, if the victim receiver is configured to receive Wi-Fi transmissions, the method may include determining whether Wi-Fi is active or not. If the victim receiver is active, then at decision block 1406, the method 1400 includes determining whether the bandwidth of the carrier signal is below some threshold. In response to the bandwidth of the carrier signal being below the threshold, the method 1400 includes selecting the bypass signal path as indicated by block 1408 (e.g., causing the switching circuitry 202 to connect the transceiver unit 126-1 to the antenna 130 via the bypass signal path). If the bandwidth of the carrier signal is above the threshold, then at decision block 1410, the method 1400 includes determining whether a distance between the center frequency of the carrier signal (e.g., aggressor signal) and the victim band is above a threshold (this may include in different aspects such as the distance between the center frequency and the edge of the victim band and/or the distance between the center frequency and the current victim center operating frequency). In response to the distance being above the threshold, the method 1400 includes selecting the bypass signal path as indicated by block 1412. If the distance is below the threshold, then at decision block 1414, the method 1400 includes determining whether a power level of the carrier signal is below a threshold. In response to determining the power level is below the threshold, the method 1400 includes selecting the bypass signal path as indicated by block 1416. If the power level is above a threshold, then at block 1418, the method includes selecting the filtered signal path.

It should be appreciated that the decision blocks in the method 1400 may be re-arranged such that the power level threshold level decision block may be block 1402 and the bandwidth threshold level decision block may be block 1406. In any event, the method 1400 may therefore include a combination of decision blocks that may correspond to different combinations of the bandwidth, center frequency, power level, victim frequency, and other control parameters for a particular frequency band with a determination of whether to select the bypass signal path or filtered signal path similar to those shown by the blocks of the method 1400 of FIG. 14.

As a result of these operations, full concurrency between different wireless protocols can be supported to prevent interference while incurring insertion loss at limited times when warranted for supporting concurrency.

Figure 15:
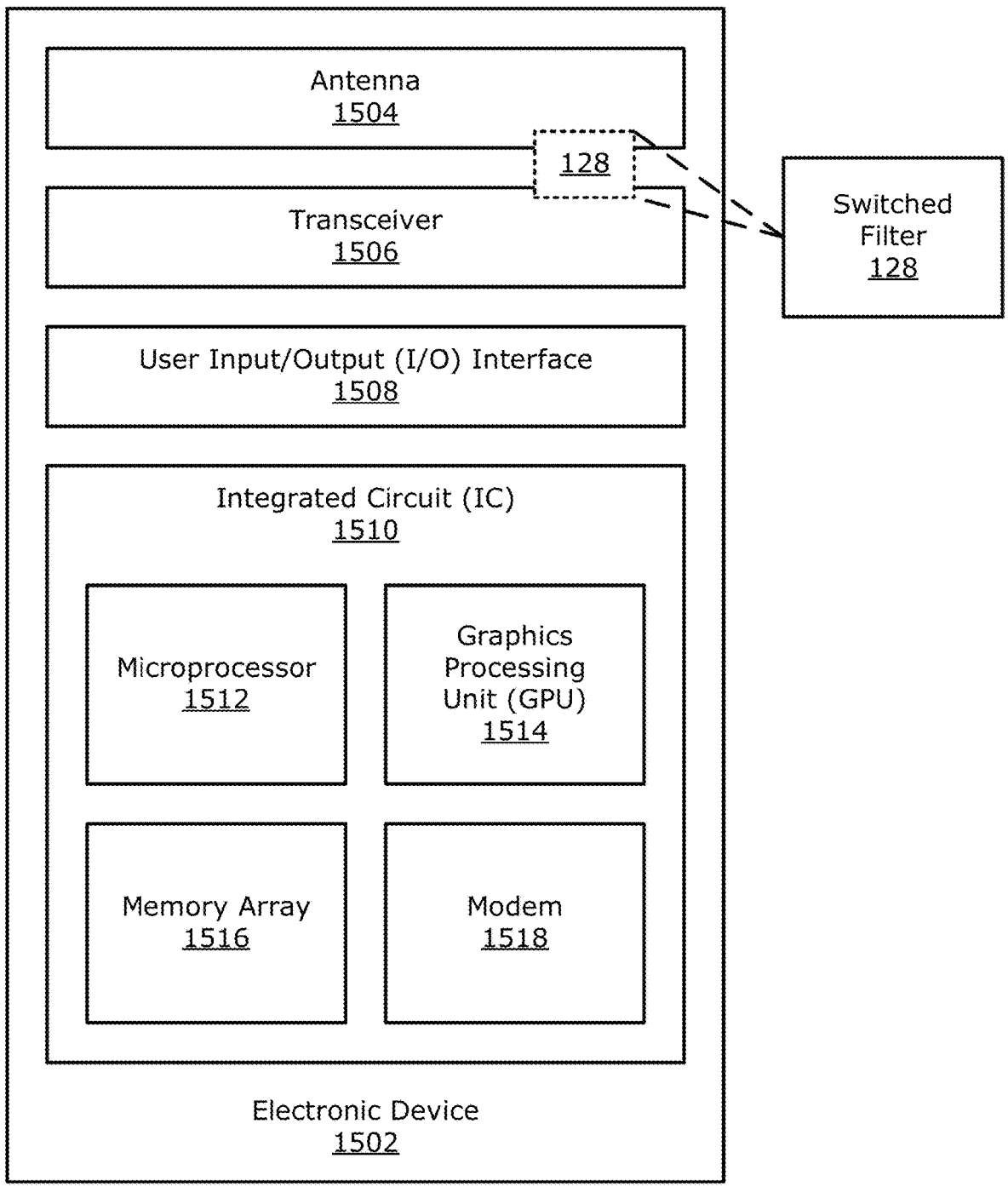
FIG. 15 illustrates an example electronic device, which includes an integrated circuit, that can implement enhanced coexistence management.

FIG. 15 illustrates an example electronic device 1502, which includes an integrated circuit 1510 (IC), that can implement enhanced coexistence management. As shown, the electronic device 1502 includes an antenna 1504, a transceiver 1506, and a user input/output (I/O) interface 1508, in addition to the integrated circuit 1510. Illustrated examples of the integrated circuit 1510, or cores thereof, include a microprocessor 1512, a graphics processing unit (GPU) 1514, a memory array 1516, and a modem 1518. Each component can be operably coupled to another component, such as the GPU 1514 being operably coupled to the user I/O interface 1508. In one or more example implementations, a switched filter 128 as described herein can be implemented between the antenna 1504 and the transceiver 1506 so that an incoming signal can be selectively filtered.

The electronic device 1502 can be a mobile or battery-powered device or a fixed device that is designed to be powered by an electrical grid. Examples of the electronic device 1502 include a server computer, a network switch or router, a blade of a data center, a personal computer, a desktop computer, a notebook or laptop computer, a tablet computer, a smart phone, an entertainment appliance, or a wearable electronic device such as a smartwatch, intelligent glasses, or an article of clothing. An electronic device 1502 can also be a device, or a portion thereof, having embedded electronics. Examples of the electronic device 1502 with embedded electronics include a passenger vehicle, industrial equipment, a refrigerator or other home appliance, a drone or other unmanned aerial vehicle (UAV), or a power tool.

For an electronic device with a wireless capability, the electronic device 1502 includes an antenna 1504 that is coupled to a transceiver 1506 to enable reception or transmission of one or more wireless signals. The integrated circuit 1510 may be coupled to the transceiver 1506 to enable the integrated circuit 1510 to have access to received wireless signals or to provide wireless signals for transmission via the antenna 1504. The electronic device 1502 as shown also includes at least one user I/O interface 1508. Examples of the user I/O interface 1508 include a keyboard, a mouse, a microphone, a touch-sensitive screen, a camera, an accelerometer, a haptic mechanism, a speaker, a display screen, or a projector. The transceiver 1506 can correspond to, for example, the wireless transceiver 122 (e.g., of FIGS. 1 and 2 1) that is coupled to a switched filter 128 as described herein.

The integrated circuit 1510 may comprise, for example, one or more instances of a microprocessor 1512, a GPU 1514, a memory array 1516, a modem 1518, and so forth. The microprocessor 1512 may function as a central processing unit (CPU) or other general-purpose processor. Some microprocessors include different parts, such as multiple processing cores, that may be individually powered on or off. The GPU 1514 may be especially adapted to process visual related data for display, such as video data images. If visual-related data is not being rendered or otherwise processed, the GPU 1514 may be fully or partially powered down. The memory array 1516 stores data for the microprocessor 1512 or the GPU 1514. Example types of memory for the memory array 1516 include random access memory (RAM), such as dynamic RAM (DRAM) or static RAM (SRAM); flash memory; and so forth. If programs are not accessing data stored in memory, the memory array 1516 may be powered down overall or block-by-block. The modem 1518 demodulates a signal to extract encoded information or modulates a signal to encode information into the signal. If there is no information to decode from an inbound communication or to encode for an outbound communication, the modem 1518 may be idled to reduce power consumption. The integrated circuit 1510 may include additional or alternative parts than those that are shown, such as an I/O interface, a sensor such as an accelerometer, a transceiver or another part of a receiver chain, a customized or hard-coded processor such as an application-specific integrated circuit (ASIC), and so forth.

The integrated circuit 1510 may also comprise a system on chip (SoC). An SoC may integrate a sufficient number of different types of components to enable the SoC to provide computational functionality as a notebook computer, a mobile phone, or another electronic apparatus using one chip, at least primarily. Components of an SoC, or an integrated circuit 1510 generally, may be termed cores or circuit blocks. Examples of cores or circuit blocks include, in addition to those that are illustrated in FIG. 15, a voltage regulator, a main memory or cache memory block, a memory controller, a general-purpose processor, a cryptographic processor, a video or image processor, a vector processor, a radio, an interface or communications subsystem, a wireless controller, or a display controller. Any of these cores or circuit blocks, such as a central processing unit or a multimedia processor, may further include multiple internal cores or circuit blocks.

Implementation examples are described in the following numbered clauses:

1. A wireless communications apparatus comprising:
   a switched filter coupled to an antenna, the switched filter including:
   a filter;
   a bypass line; and
   switching circuitry coupled to the filter and the bypass line, the switching circuitry configured to selectively establish a bypass signal path including the bypass line or a filtered signal path including the filter;
   a transceiver unit coupled to the antenna via the switched filter, the transceiver unit configured to process a carrier signal transmitted or received via the antenna; and
   a switched filter controller coupled to the switching circuitry, the switched filter controller configured to cause the switching circuitry to selectively connect the transceiver unit to the antenna via the bypass signal path or via the filtered signal path based at least on a frequency band of the carrier signal and a bandwidth of the carrier signal.

2. The wireless communications apparatus of clause 1, wherein the switched filter controller is configured to cause the switching circuitry to selectively connect the transceiver unit to the antenna via the bypass signal path or via the filtered signal path based further on a location of a center frequency of the carrier signal within the frequency band.

3. The wireless communications apparatus of clause 2, wherein the switched filter controller is configured to cause the switching circuitry to selectively connect the transceiver unit to the antenna via the bypass signal path or via the filtered signal path based further on a proximity of the center frequency of the carrier signal within the frequency band to a different frequency band.

4. The wireless communications apparatus of any of clauses 1-3, wherein the switched filter controller is configured to cause the switching circuitry to selectively connect the transceiver unit to the antenna via the bypass signal path or via the filtered signal path based further on a power level of the carrier signal.

5. The wireless communications apparatus of any of clauses 1-4, wherein the switched filter controller is configured to cause the switching circuitry to selectively connect the transceiver unit to the antenna via the bypass signal path or via the filtered signal path based further on a frequency of a second signal within a second frequency band different from the frequency band.

6. The wireless communications apparatus of any of clauses 1-4, wherein the switched filter controller is configured to cause the switching circuitry to selectively connect the transceiver unit to the antenna via the bypass signal path or via the filtered signal path based further on a location of a center frequency of a second signal within a second frequency band adjacent to the frequency band.

7. The wireless communications apparatus of any of clauses 1-6, wherein the filter is a notch filter having a frequency rejection band that is adjacent to the frequency band of the carrier signal.

8. The wireless communications apparatus of any of clauses 1-6, wherein the filter is a notch filter having a frequency rejection band that is in a second frequency band within which the carrier signal causes interference.

9. The wireless communications apparatus of any of clauses 1-8, wherein the switched filter controller is configured to cause the switching circuitry to selectively connect the transceiver unit to the antenna via the bypass signal path in response to determining that an interference level is lower than a threshold interference level based on the frequency band and the bandwidth of the carrier signal, wherein the switched filter controller is configured to cause the switching circuitry to selectively connect the transceiver unit to the antenna via the filtered signal path in response to determining that the interference level is above the threshold interference level based on the frequency band and the bandwidth of the carrier signal.

10. The wireless communications apparatus of any of clauses 1-9, wherein the switched filter controller is configured to cause the switching circuitry to selectively connect the transceiver unit to the antenna via the filtered signal path in response to determining that the bandwidth of the carrier signal is above a threshold bandwidth, and configured to cause the switching circuitry to selectively connect the transceiver unit to the antenna via the bypass path in response to determining that the bandwidth of the carrier signal is below a threshold bandwidth.

11. The wireless communications apparatus of any of clauses 1-10, wherein the carrier signal is associated with a WWAN protocol and the filter is configured to have a rejection band within a frequency band of a WLAN protocol.

12. The wireless communications apparatus of clause 11, wherein the frequency band is n41 and the rejection band is within a 2.4 GHz Wi-Fi band.

13. The wireless communications apparatus of clause 11, wherein the frequency band is n79 and the rejection band is within a 5 GHz Wi-Fi band.

14. The wireless communications apparatus of any of clauses 1-13, further comprising an extractor circuit comprising a first filter and a second filter different than the filter of the switched filter, wherein the extractor circuit is coupled between the antenna and the switched filter.

15. The wireless communications apparatus of clause 1, further comprising a second transceiver unit, wherein the switched filter controller is configured to cause the switching circuitry to selectively connect the transceiver unit to the antenna via the bypass signal path or via the filtered signal path based further on information from the second transceiver unit.

16. The wireless communications apparatus of clause 1, wherein the switched filter controller is configured to calculate a value indicative of a level of interference caused by transceiver unit, the switched filter controller configured to cause the switching circuitry to selectively connect the transceiver unit to the antenna via the bypass signal path or the filtered signal path based on the value.

17. A wireless communications apparatus comprising:
a switched filter coupled to an antenna, the switched filter including:
a notch filter having a rejection band in a Wi-Fi frequency band;
a bypass line; and
switching circuitry coupled to the notch filter and the bypass line, the switching circuitry configured to selectively establish a bypass signal path including the bypass line or a filtered signal path including the notch filter;
a transceiver unit coupled to the antenna via the switched filter, the transceiver unit configured to process a carrier signal for an n41 or n79 frequency band transmitted or received via the antenna; and
a switched filter controller coupled to the switching circuitry, the switched filter controller configured to cause the switching circuitry to selectively connect the transceiver unit to the antenna via the bypass signal path or via the filtered signal path based at least on a bandwidth of the carrier signal.

18. A method for wireless communications, the method comprising:
receiving information associated with a carrier signal including a frequency band of the carrier signal and a bandwidth of the carrier signal; and
selectively causing switching circuitry to connect a transceiver unit to an antenna via one of a filtered signal path that includes a filter or a bypass signal path that bypasses the filter based on the information.

19. The method of clause 18, wherein receiving information further comprises receiving, as part of the information, a location of a center frequency of the carrier signal within the frequency band.

20. The method of any of clauses 18-19, wherein receiving information further comprises receiving, as part of the information, a power level of the carrier signal.

21. The method of any of clauses 18-20, wherein receiving information further comprises receiving, as part of the information, a frequency of a second signal within a second frequency band different from the frequency band.

22. The method of any of clauses 18-21, wherein the filter is a notch filter having a frequency rejection band that is in a second frequency band within which the carrier signal causes interference.

23. The method of any of clauses 18-22, wherein selectively causing the switching circuitry to connect the transceiver unit to the antenna via the filtered signal path or the bypass signal path further includes determining that the bandwidth of the carrier signal is above a threshold bandwidth and causing the switching circuitry to connect the transceiver unit to the antenna via the filtered signal path, and wherein selectively causing the switching circuitry to connect the transceiver unit to the antenna via the filtered signal path or the bypass signal path further includes determining that the bandwidth of the carrier signal is below a threshold bandwidth and causing the switching circuitry to connect the transceiver unit to the antenna via the bypass signal path.

24. The method of any of clauses 18-23, wherein the carrier signal is associated with a WWAN protocol and the filter is configured to have a rejection band within a frequency band of a WLAN protocol.

25. The method of clause 18, wherein selectively causing the switching circuitry to connect the transceiver unit to the antenna via the filtered signal path or the bypass signal path further includes calculating a value indicative of a level of interference caused by the transceiver unit based on the information and selectively causing the switching circuitry to connect the transceiver unit to the antenna via the filtered signal path or the bypass signal path based on the value.

26. A wireless communications apparatus comprising:
a transceiver unit configured to process a carrier signal transmitted or received via an antenna;
a first filter coupled between the antenna and the transceiver unit, the first filter configured to attenuate frequencies in a first frequency rejection band; and
a switched filter coupled between the first filter and the transceiver unit, the switched filter including:
a second filter configured to attenuate frequencies in a second frequency rejection band at least partially overlapping the first frequency rejection band;
a bypass line; and
switching circuitry coupled to the second filter and the bypass line, the switching circuitry configured to selectively establish a bypass signal path including the bypass line or a filtered signal path including the second filter.

27. The wireless communications apparatus of clause 26, wherein a quality factor of the first filter is less than a quality factor of the second filter.

28. The wireless communications apparatus of any of clauses 26-27, further comprising an extractor circuit comprising the first filter and a third filter.

29. The wireless communications apparatus of any of clauses 26-28, wherein a frequency of the carrier signal is outside of the first frequency rejection band.

30. The wireless communications apparatus of any of clauses 26-29, further comprising a switched filter controller coupled to the switching circuitry, the switched filter controller configured to cause the switching circuitry to selectively connect the transceiver unit to the antenna via the bypass signal path or via the filtered signal path based at least on a frequency band of the carrier signal and a bandwidth of the carrier signal.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Further, items represented in the accompanying figures and terms discussed herein may be indicative of one or more items or terms, and thus reference may be made interchangeably to single or plural forms of the items and terms in this written description. Finally, although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

What is claimed is:

1. A wireless communications apparatus comprising:
   a switched filter coupled to an antenna, the switched filter including:
      a filter;
      a bypass line; and
      switching circuitry coupled to the filter and the bypass line, the switching circuitry configured to selectively establish a bypass signal path including the bypass line or a filtered signal path including the filter;
   a transceiver unit coupled to the antenna via the switched filter, the transceiver unit configured to process a carrier signal transmitted or received via the antenna; and
   a switched filter controller coupled to the switching circuitry, the switched filter controller configured to cause the switching circuitry to selectively connect the transceiver unit to the antenna via the bypass signal path based at least on a frequency band of the carrier signal and a bandwidth of the carrier signal being below a threshold bandwidth, the switched filter controller further configured to cause the switching circuitry to selectively connect the transceiver unit to the antenna via the filtered signal path based at least on the frequency band of the carrier signal and the bandwidth of the carrier signal being above a threshold bandwidth.

2. The wireless communications apparatus of claim 1, wherein the switched filter controller is configured to cause the switching circuitry to selectively connect the transceiver unit to the antenna via the bypass signal path or via the filtered signal path based further on a location of a center frequency of the carrier signal within the frequency band.

3. The wireless communications apparatus of claim 2, wherein the switched filter controller is configured to cause the switching circuitry to selectively connect the transceiver unit to the antenna via the bypass signal path or via the filtered signal path based further on a proximity of the center frequency of the carrier signal within the frequency band to a different frequency band.

4. The wireless communications apparatus of claim 1, wherein the switched filter controller is configured to cause the switching circuitry to selectively connect the transceiver unit to the antenna via the bypass signal path or via the filtered signal path based further on a power level of the carrier signal.

5. The wireless communications apparatus of claim 1, further comprising a second transceiver unit configured to process a second signal within a second frequency band different from the frequency band of the carrier signal, wherein the switched filter controller is configured to cause the switching circuitry to selectively connect the transceiver unit to the antenna via the bypass signal path or via the filtered signal path based further on a frequency of the second signal.

6. The wireless communications apparatus of claim 1, further comprising a second transceiver unit configured to process a second signal within a second frequency band adjacent to the frequency band of the carrier signal, wherein the switched filter controller is configured to cause the switching circuitry to selectively connect the transceiver unit to the antenna via the bypass signal path or via the filtered signal path based further on a location of a center frequency of the second signal.

7. The wireless communications apparatus of claim 1, wherein the filter is a notch filter having a frequency rejection band that is adjacent to the frequency band of the carrier signal.

8. The wireless communications apparatus of claim 1, wherein the filter is a notch filter having a frequency rejection band that is in a second frequency band within which the carrier signal causes interference.

9. The wireless communications apparatus of claim 1, wherein the switched filter controller is configured to cause the switching circuitry to selectively connect the transceiver unit to the antenna via the bypass signal path in response to determining that an interference level is lower than a threshold interference level based on the frequency band and the bandwidth of the carrier signal being below the threshold bandwidth, wherein the switched filter controller is configured to cause the switching circuitry to selectively connect the transceiver unit to the antenna via the filtered signal path in response to determining that the interference level is above the threshold interference level based on the frequency band and the bandwidth of the carrier signal being above the threshold bandwidth.

10. The wireless communications apparatus of claim 1, wherein the carrier signal is associated with a WWAN protocol and the filter is configured to have a rejection band within a frequency band of a WLAN protocol.

11. The wireless communications apparatus of claim 10, wherein the frequency band is n41 and the rejection band is within a 2.4 GHz Wi-Fi band.

12. The wireless communications apparatus of claim 10, wherein the frequency band is n79 and the rejection band is within a 5 GHz Wi-Fi band.

13. The wireless communications apparatus of claim 1, further comprising an extractor circuit comprising a first filter and a second filter different than the filter of the switched filter, wherein the extractor circuit is coupled between the antenna and the switched filter.

14. The wireless communications apparatus of claim 1, further comprising a second transceiver unit, wherein the switched filter controller is configured to cause the switching circuitry to selectively connect the transceiver unit to the antenna via the bypass signal path or via the filtered signal path based further on information from the second transceiver unit.

15. The wireless communications apparatus of claim 1, wherein the switched filter controller is configured to calculate a value indicative of a level of interference caused by transceiver unit, the switched filter controller configured to cause the switching circuitry to selectively connect the transceiver unit to the antenna via the bypass signal path or the filtered signal path based further on the value.

16. A wireless communications apparatus comprising:
  a switched filter coupled to an antenna, the switched filter including:
    a notch filter having a rejection band in a Wi-Fi frequency band;
    a bypass line; and
    switching circuitry coupled to the notch filter and the bypass line, the switching circuitry configured to selectively establish a bypass signal path including the bypass line or a filtered signal path including the notch filter;
  a transceiver unit coupled to the antenna via the switched filter, the transceiver unit configured to process a carrier signal for an n41 or n79 frequency band transmitted or received via the antenna; and
  a switched filter controller coupled to the switching circuitry, the switched filter controller configured to cause the switching circuitry to selectively connect the transceiver unit to the antenna via the bypass signal path or via the filtered signal path based at least on a bandwidth of the carrier signal being above or below a threshold bandwidth.

17. A method for wireless communications, the method comprising:
  receiving information associated with a carrier signal including a frequency band of the carrier signal and a bandwidth of the carrier signal; and
  selectively causing switching circuitry to connect a transceiver unit to an antenna via one of a filtered signal path that includes a filter or a bypass signal path that bypasses the filter based on the information, wherein selectively causing the switching circuitry to connect the transceiver unit to the antenna via the filtered signal path or the bypass signal path further includes determining that the bandwidth of the carrier signal is above a threshold bandwidth and causing the switching circuitry to connect the transceiver unit to the antenna via the filtered signal path, and wherein selectively causing the switching circuitry to connect the transceiver unit to the antenna via the filtered signal path or the bypass signal path further includes determining that the bandwidth of the carrier signal is below a threshold bandwidth and causing the switching circuitry to connect the transceiver unit to the antenna via the bypass signal path.

18. The method of claim 17, wherein receiving information further comprises receiving, as part of the information, a location of a center frequency of the carrier signal within the frequency band.

19. The method of claim 17, wherein receiving information further comprises receiving, as part of the information, a power level of the carrier signal.

20. The method of claim 17, wherein receiving information further comprises receiving, as part of the information, a frequency of a second signal within a second frequency band different from the frequency band, the second signal associated with a second transceiver unit.

21. The method of claim 17, wherein the filter is a notch filter having a frequency rejection band that is in a second frequency band within which the carrier signal causes interference.

22. The method of claim 17, wherein the carrier signal is associated with a WWAN protocol and the filter is configured to have a rejection band within a frequency band of a WLAN protocol.

23. The method of claim 17, wherein selectively causing the switching circuitry to connect the transceiver unit to the antenna via the filtered signal path or the bypass signal path further includes calculating a value indicative of a level of interference caused by the transceiver unit based on the information and selectively causing the switching circuitry to connect the transceiver unit to the antenna via the filtered signal path or the bypass signal path based on the value.

24. A wireless communications apparatus comprising:
  a transceiver unit configured to process a carrier signal transmitted or received via an antenna, the transceiver unit comprising a power amplifier;
  a switched filter coupled between the antenna and the power amplifier of the transceiver unit, the switched filter including:
    a filter;
    a bypass line; and switching circuitry coupled to the filter and the bypass line, the switching circuitry configured to selectively establish a bypass signal path including the bypass line or a filtered signal path including the filter; and a switched filter controller coupled to the switching circuitry, the switched filter controller configured to cause the switching circuitry to selectively connect the transceiver unit to the antenna via the bypass signal path including the bypass line based on a first operating condition associated with a first level of interference caused by the transceiver unit, the switched filter controller further configured to cause the switching circuitry to selectively connect the transceiver unit to the antenna via the filtered signal path including the filter based on a second operating condition associated with a second level of interference, the first level of interference being lower than the second level of interference.

25. The wireless communications apparatus of claim 24, wherein the filter is a second filter and wherein the wireless communications apparatus further comprises a first filter coupled between the antenna and the switched filter, wherein a quality factor of the first filter is less than a quality factor of the second filter.

26. The wireless communications apparatus of claim 24, wherein the filter is a second filter and wherein the wireless communications apparatus further comprises a first filter coupled between the antenna and the switched filter, wherein the wireless communications apparatus further comprises an extractor circuit comprising the first filter and a third filter.

27. The wireless communications apparatus of claim 24, wherein the filter is a second filter and wherein the wireless communications apparatus further comprises a first filter coupled between the antenna and the switched filter, the first filter configured to attenuate frequencies in a first frequency rejection band, wherein a frequency of the carrier signal is outside of the first frequency rejection band.

28. The wireless communications apparatus of claim 24, wherein the first operating condition and the second operating condition are based at least on a frequency band of the carrier signal and a bandwidth of the carrier signal.

* * * * *